(12) United States Patent
Najafi et al.

(10) Patent No.: US 10,495,663 B2
(45) Date of Patent: *Dec. 3, 2019

(54) HIGH ASPECT-RATIO LOW NOISE MULTI-AXIS ACCELEROMETERS

(71) Applicant: THE REGENTS OF THE UNIVERSITY OF MICHIGAN, Ann Arbor, MI (US)

(72) Inventors: Khalil Najafi, Ann Arbor, MI (US); Yemin Tang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 318 days.

This patent is subject to a terminal disclaimer.

(21) Appl. No.: 15/436,774

(22) Filed: Feb. 18, 2017

(65) Prior Publication Data
US 2018/0113146 A1 Apr. 26, 2018

Related U.S. Application Data

(60) Provisional application No. 62/297,327, filed on Feb. 19, 2016.

(51) Int. Cl.
*G01P 15/125* (2006.01)
*G01P 15/135* (2006.01)
*G01P 15/08* (2006.01)

(52) U.S. Cl.
CPC ........ *G01P 15/135* (2013.01); *G01P 15/0894* (2013.01); *G01P 15/125* (2013.01)

(58) Field of Classification Search
CPC .... G01P 15/125; H01L 41/094; H01L 41/096; H01L 41/0966
See application file for complete search history.

(56) References Cited

U.S. PATENT DOCUMENTS 4,785,215 A * 11/1988 Blech .................... G01P 15/097
                                                            310/323.21
5,461,916 A * 10/1995 Fujii .................... B81B 7/0006
                                                            257/417
(Continued)

FOREIGN PATENT DOCUMENTS

EP   0877255 A1   11/1998
EP   1860418 A1   11/2007
JP   09054114 A * 2/1997

OTHER PUBLICATIONS

J. Chae et al., "A CMOS-compatible high aspect ratio silicon-on-glass in-plane micro-accelerometer" Journal of Micromechanics and Microengineering 15.2 (2004).

(Continued)

*Primary Examiner* — Herbert K Roberts
(74) *Attorney, Agent, or Firm* — Harness, Dickey & Pierce, P.L.C.

(57) ABSTRACT

The design and fabrication of a multi-axis capacitive accelerometer is presented with sub-µg resolution based on CMOS-compatible fabrication technology that can provide large proof-mass, high-aspect ratio and a large sense electrode area within a smaller footprint that previous accelerometers. In some instances, the device footprint can be reduced by placing the sense electrodes near the top or bottom of the transducer structure such that motion of the transducer causes size of the sense gap to vary in a direction that is parallel with longitudinal axis of the support beam for the transducer structure. An extra mass can also be added to the top of the transducer structure to increase sensitivity.

19 Claims, 41 Drawing Sheets

(56) References Cited

U.S. PATENT DOCUMENTS

| | | | |
|---|---|---|---|
| 5,892,154 A * | 4/1999 | Negoro | G01P 15/125 |
| | | | 73/514.32 |
| 6,035,714 A | 3/2000 | Yazdi et al. | |
| 6,938,484 B2 | 9/2005 | Najafi et al. | |
| 8,183,651 B2 | 5/2012 | Takagi et al. | |
| 8,705,159 B2 * | 4/2014 | Lee | G02B 26/0841 |
| | | | 359/221.2 |
| 2006/0053889 A1 * | 3/2006 | Yamamoto | F16F 1/326 |
| | | | 73/514.16 |
| 2006/0137450 A1 * | 6/2006 | Eskridge | G01P 15/0802 |
| | | | 73/514.16 |
| 2006/0138573 A1 * | 6/2006 | McAlexander, III | |
| | | | B81C 1/0015 |
| | | | 257/415 |
| 2006/0169044 A1 | 8/2006 | Hodgins et al. | |
| 2007/0119252 A1 * | 5/2007 | Adams | G01P 15/0802 |
| | | | 73/510 |
| 2008/0202239 A1 * | 8/2008 | Fazzio | G01C 19/56 |
| | | | 73/504.18 |
| 2009/0084181 A1 * | 4/2009 | Kolb | G01C 19/56 |
| | | | 73/514.16 |
| 2012/0167681 A1 * | 7/2012 | Reinmuth | B81B 3/0078 |
| | | | 73/504.12 |
| 2012/0312097 A1 * | 12/2012 | Koyama | G01P 15/125 |
| | | | 73/514.34 |
| 2012/0326566 A1 * | 12/2012 | Koyama | G01P 15/097 |
| | | | 310/338 |
| 2013/0001550 A1 * | 1/2013 | Seeger | G01L 5/223 |
| | | | 257/48 |
| 2013/0075237 A1 * | 3/2013 | Gutierrez | B81B 3/0037 |
| | | | 200/181 |
| 2013/0154442 A1 * | 6/2013 | Koyama | H01L 41/1132 |
| | | | 310/319 |
| 2013/0160547 A1 * | 6/2013 | Lee | G01P 15/125 |
| | | | 73/514.28 |
| 2013/0312522 A1 * | 11/2013 | Deng | G01H 11/08 |
| | | | 73/514.33 |
| 2014/0208849 A1 * | 7/2014 | Zhang | G01P 15/125 |
| | | | 73/514.32 |
| 2014/0252358 A1 * | 9/2014 | Chu | B81B 3/0059 |
| | | | 257/51 |
| 2014/0283604 A1 * | 9/2014 | Najafi | G01P 15/125 |
| | | | 73/514.32 |
| 2014/0361388 A1 * | 12/2014 | Chan | B81B 3/0021 |
| | | | 257/416 |
| 2015/0096378 A1 * | 4/2015 | Kigure | G01P 15/125 |
| | | | 73/514.32 |
| 2015/0135831 A1 * | 5/2015 | Nasiri | G01P 15/0802 |
| | | | 73/514.02 |
| 2015/0241216 A1 * | 8/2015 | Ahtee | G01C 19/5712 |
| | | | 73/504.12 |
| 2017/0074653 A1 * | 3/2017 | Kanazawa | G01C 19/5621 |
| 2018/0342667 A1 * | 11/2018 | Kuisma | H01L 41/1136 |

OTHER PUBLICATIONS

B. Amini, et al., "Sub-micro-gravity capacitive SOI microaccelerometers"., Solid-State Sensors, Actuators and Microsystems, 2005 Digest of Technical Papers. The 13th International Conference on TRANSDUCERS '05, vol. 1, IEEE (2005).

* cited by examiner

Gap Profile

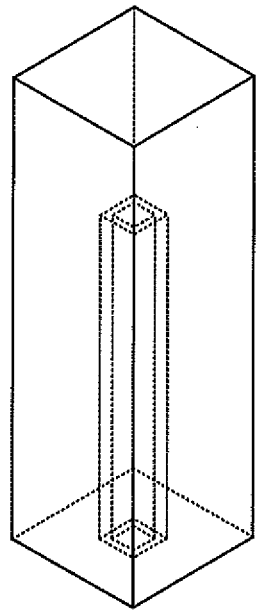 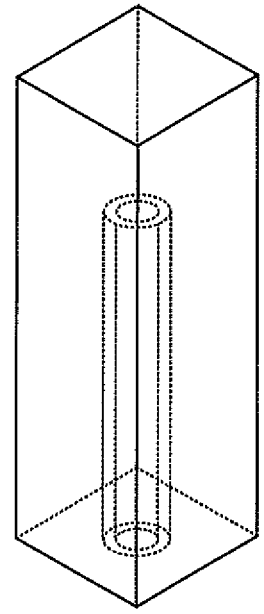
FIG. 4A          FIG. 4B
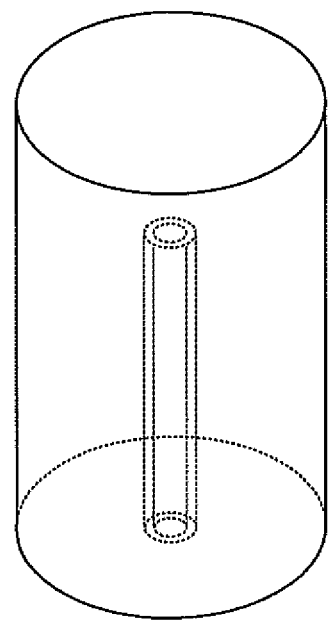
FIG. 4C

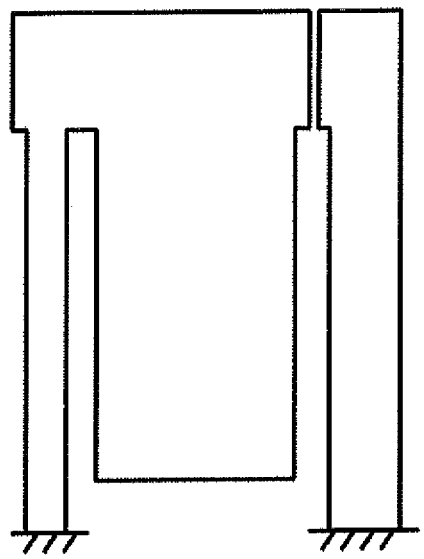
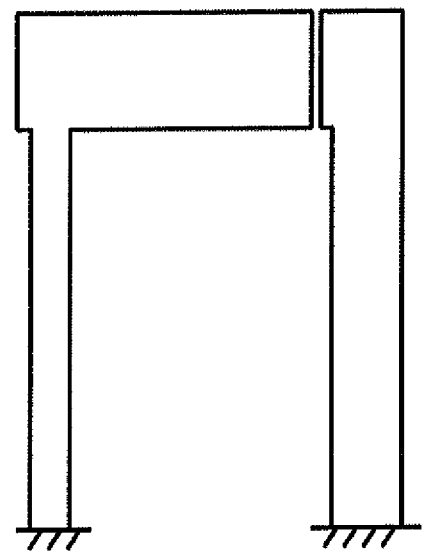
FIG. 5E  FIG. 5F
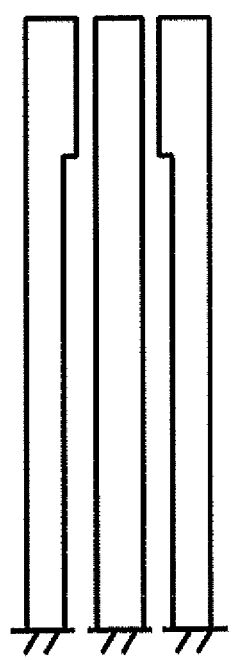
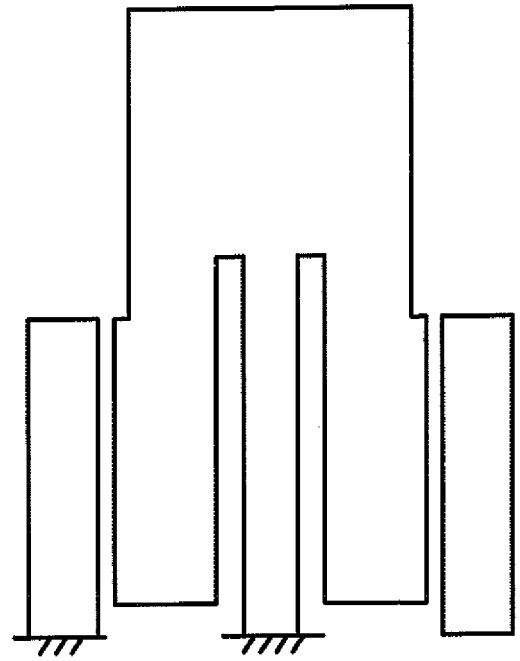
FIG. 5G  FIG. 5H

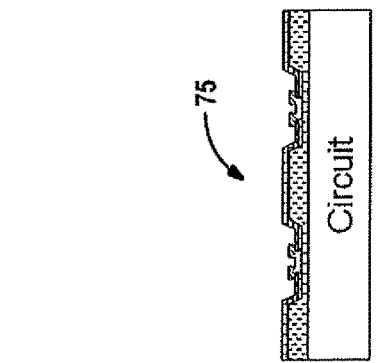
FIG. 7A
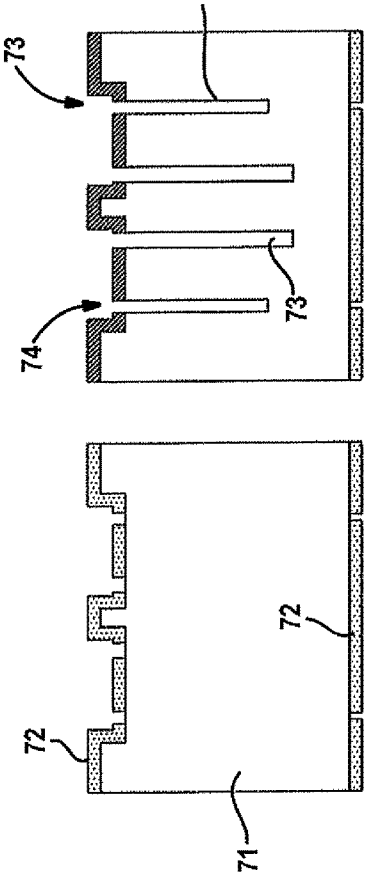
FIG. 7B
FIG. 7C
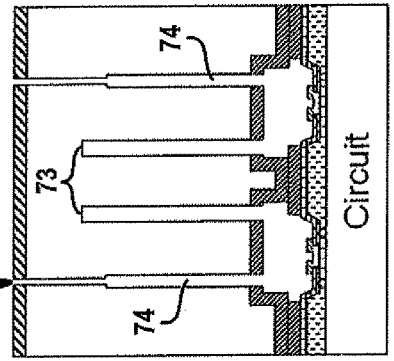
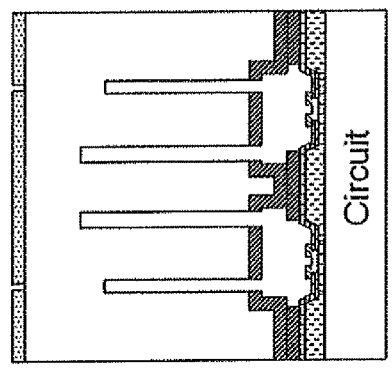
FIG. 7D
FIG. 7E
FIG. 7F
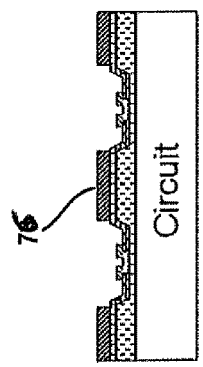

- $H = 1$ mm, a is the electorde width, b is the mass width along sense axis
  - Sense area $A = a \times h_{top}$, $h_{top} = 250$ μm;
  - Single spring: $c = 20$ μm, $d = 30$ μm, $L = 600$ μm

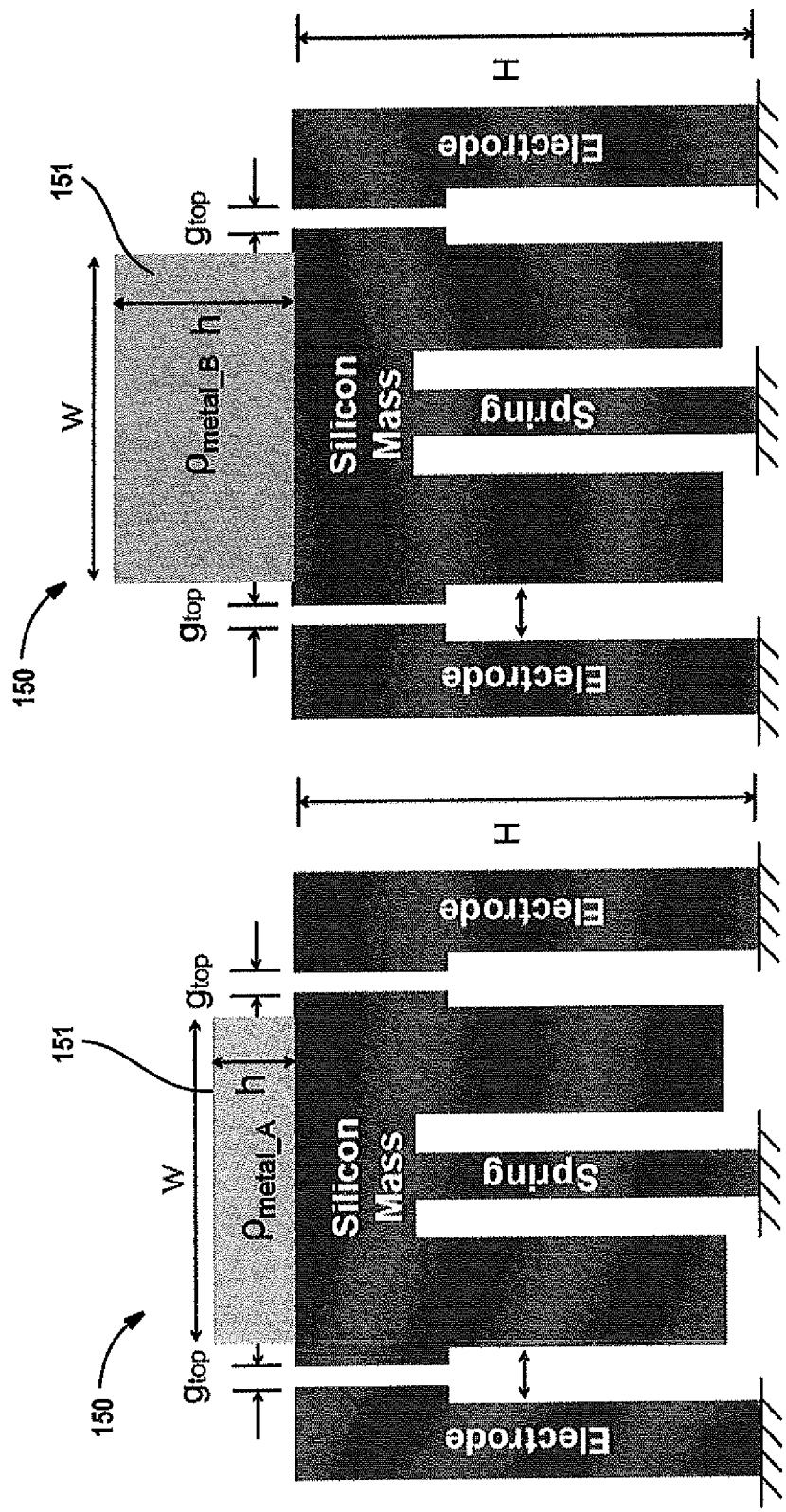

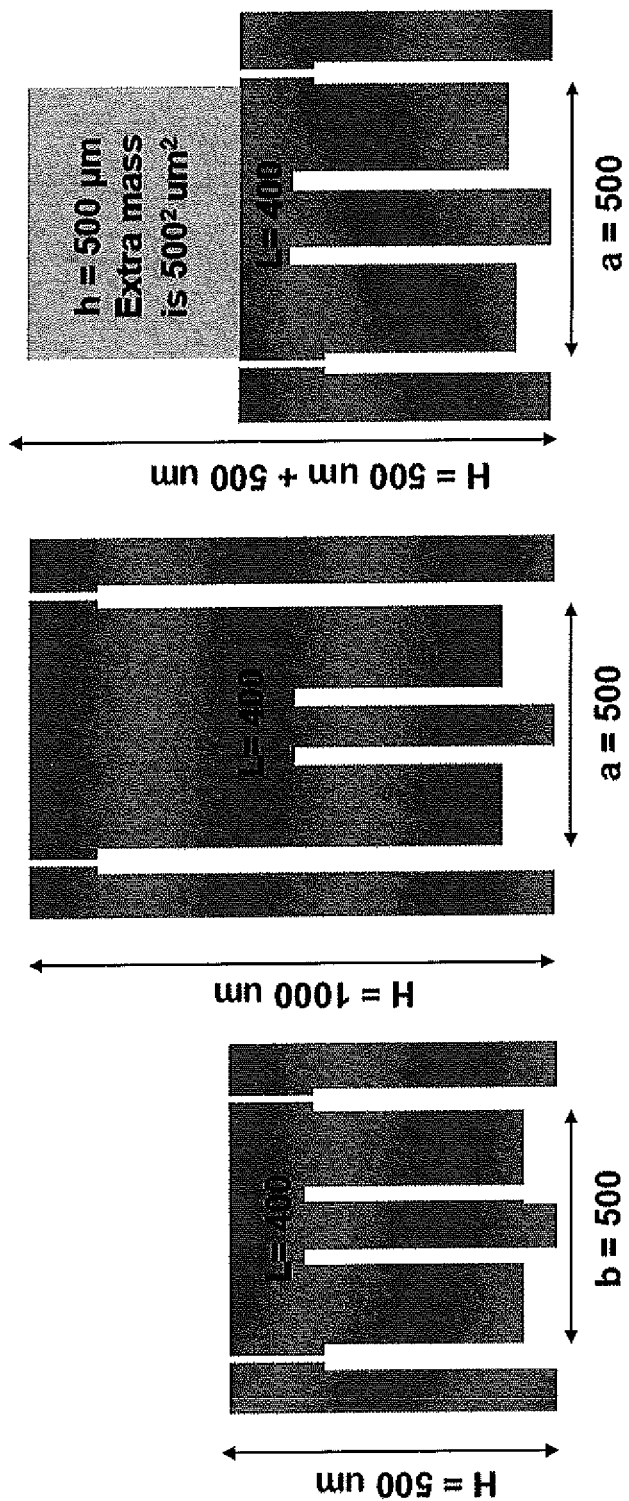

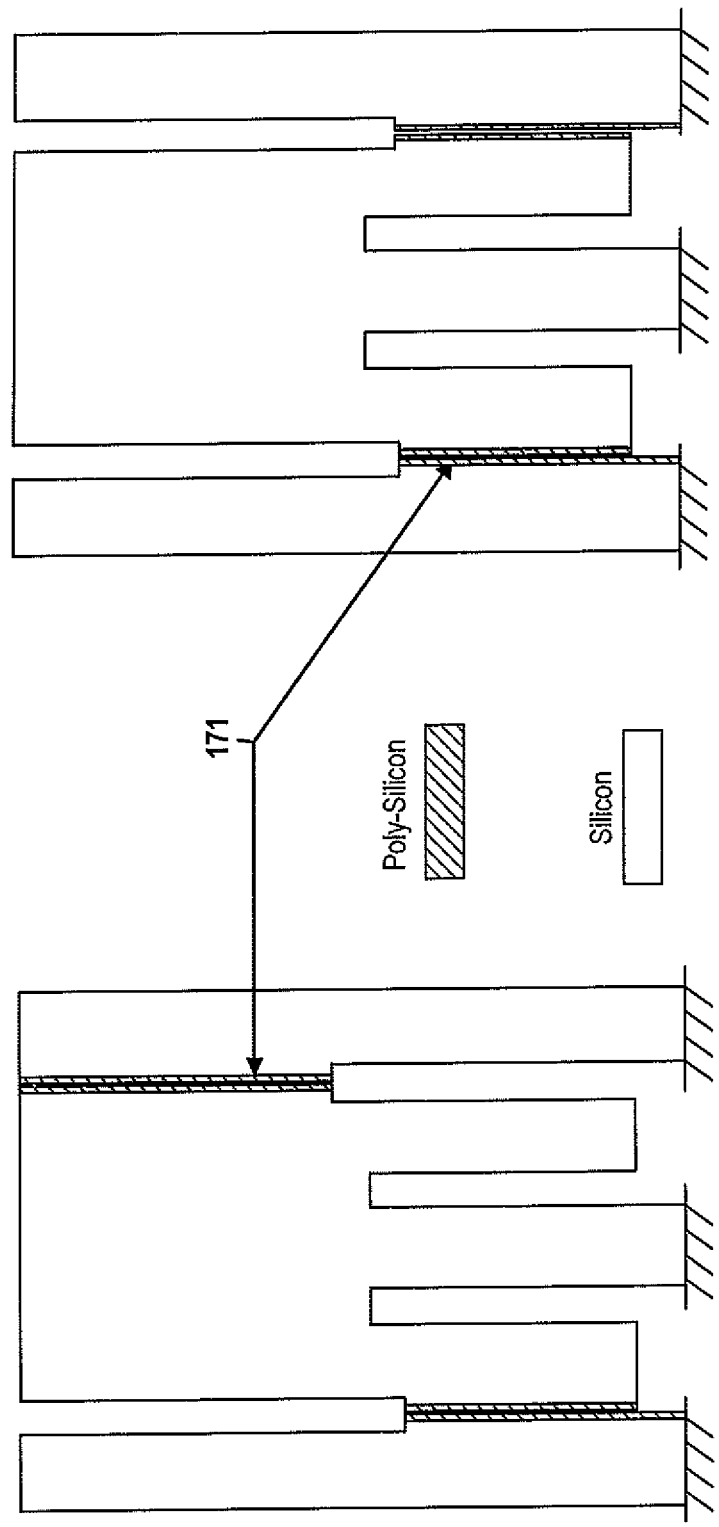

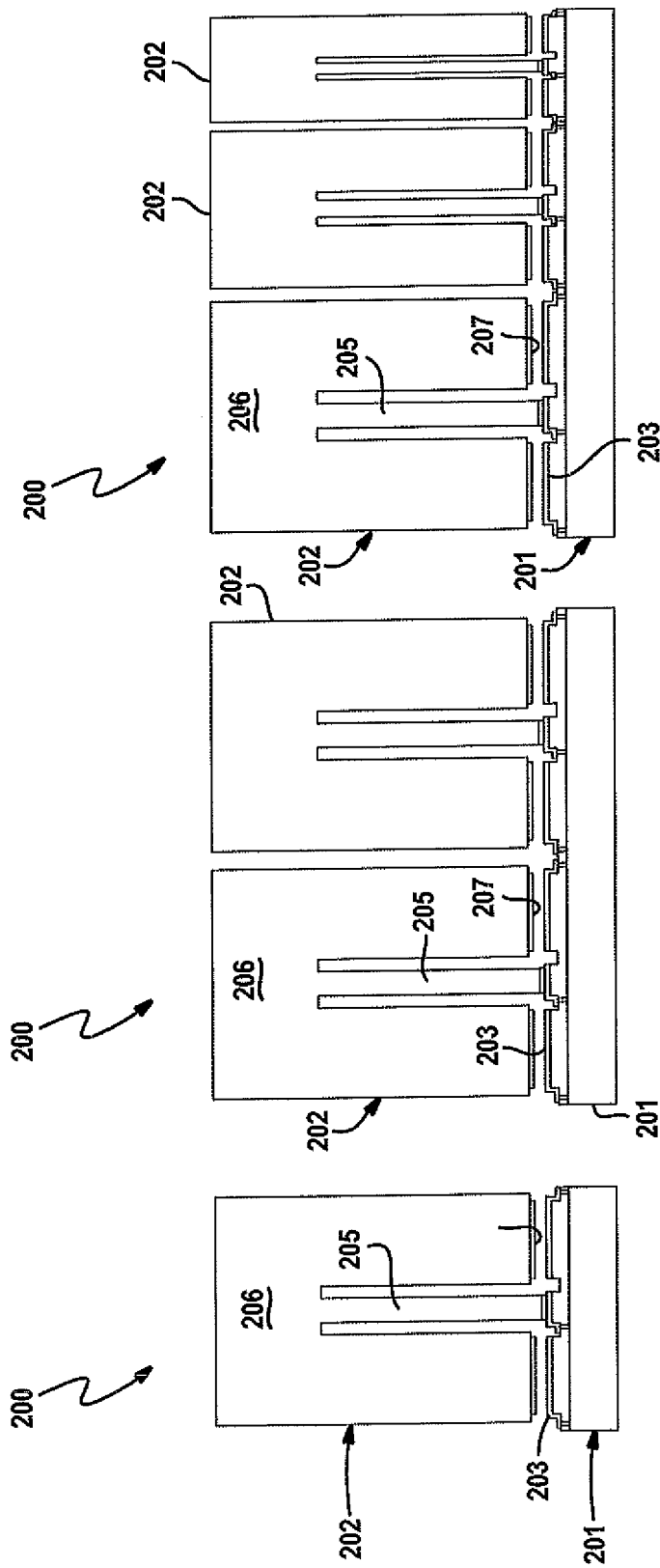

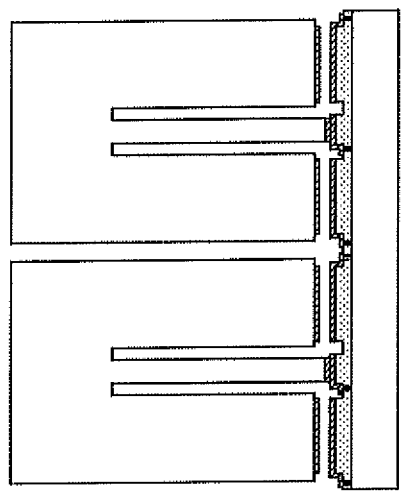
FIG. 24D
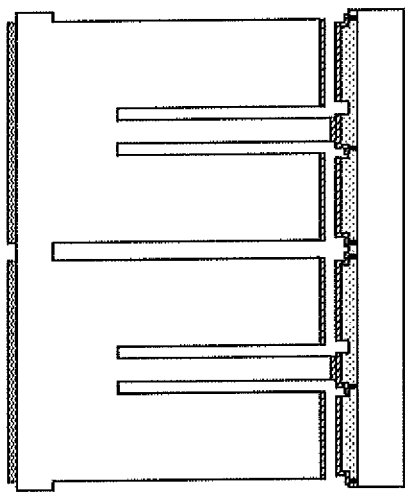
FIG. 24C
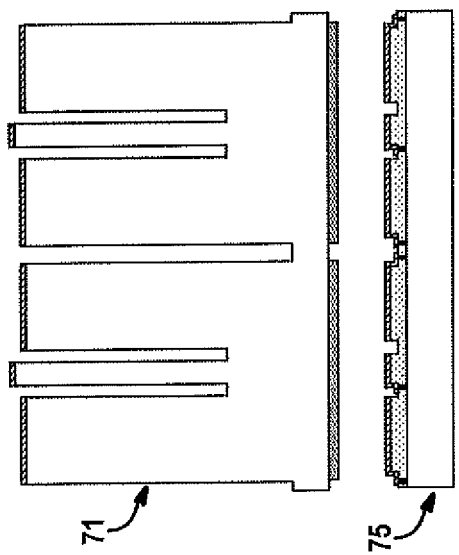
FIG. 24A
FIG. 24B

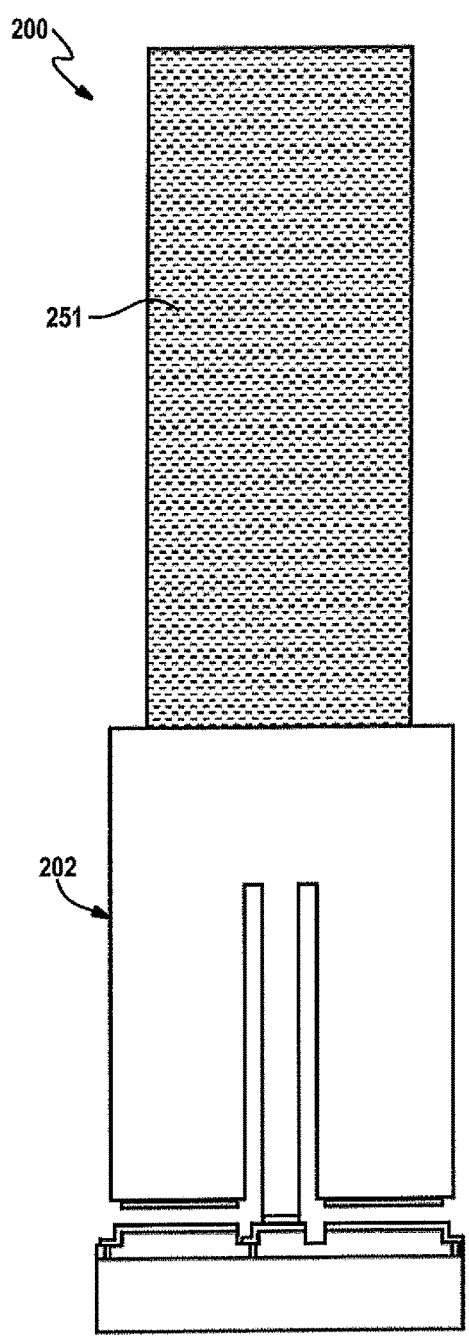 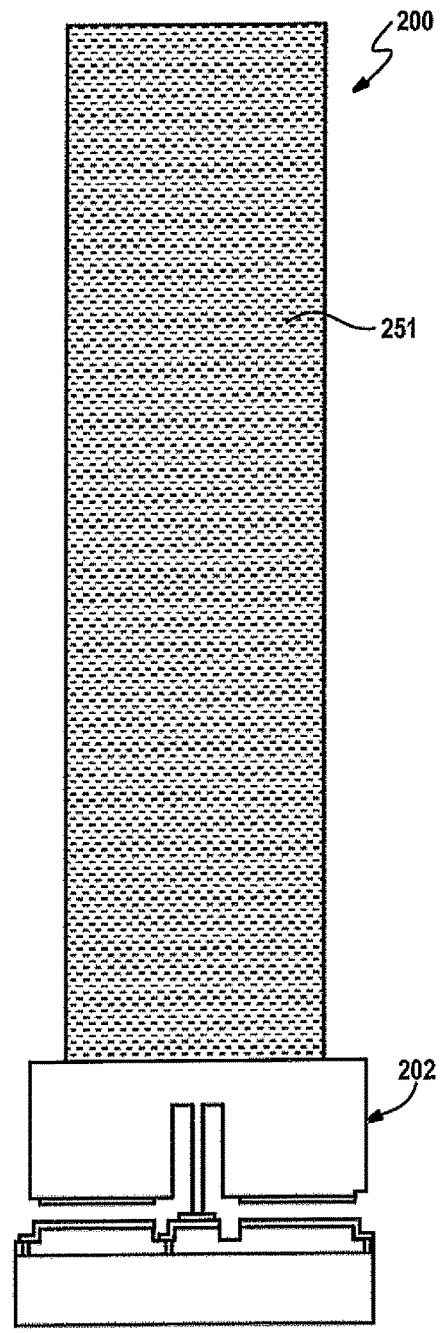
FIG. 25A  FIG. 25B

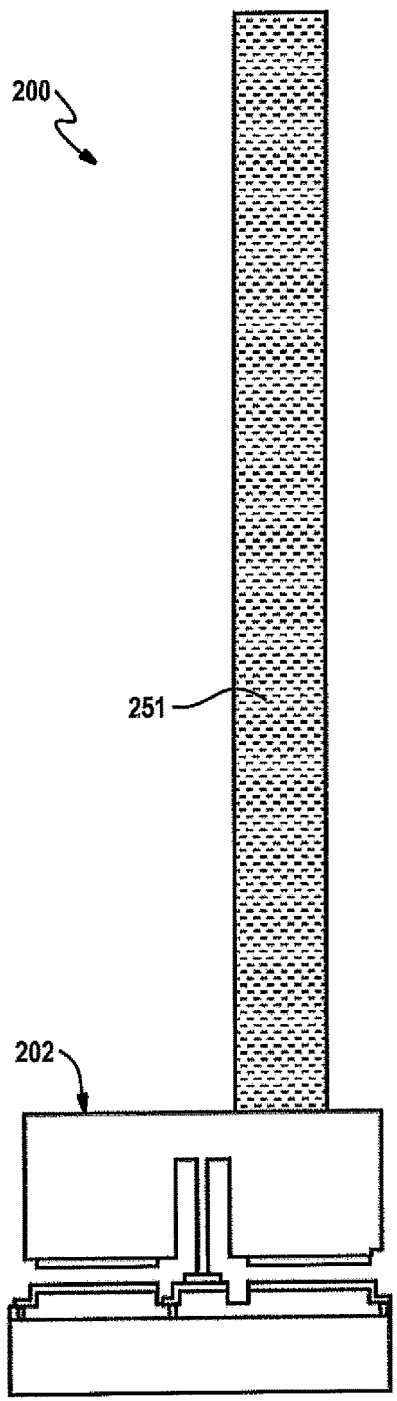
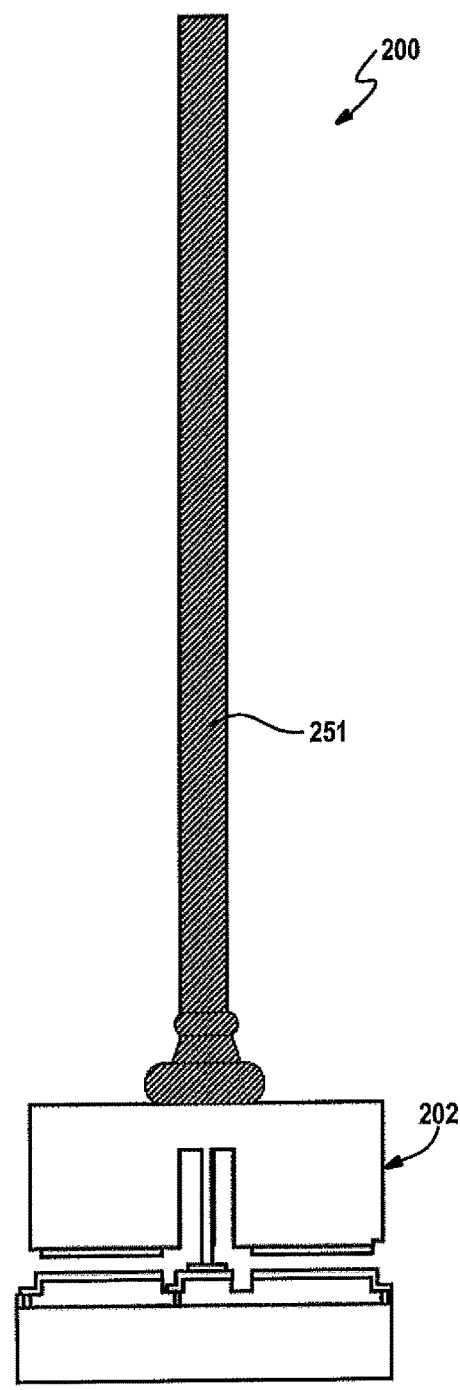
FIG. 25C  FIG. 25D

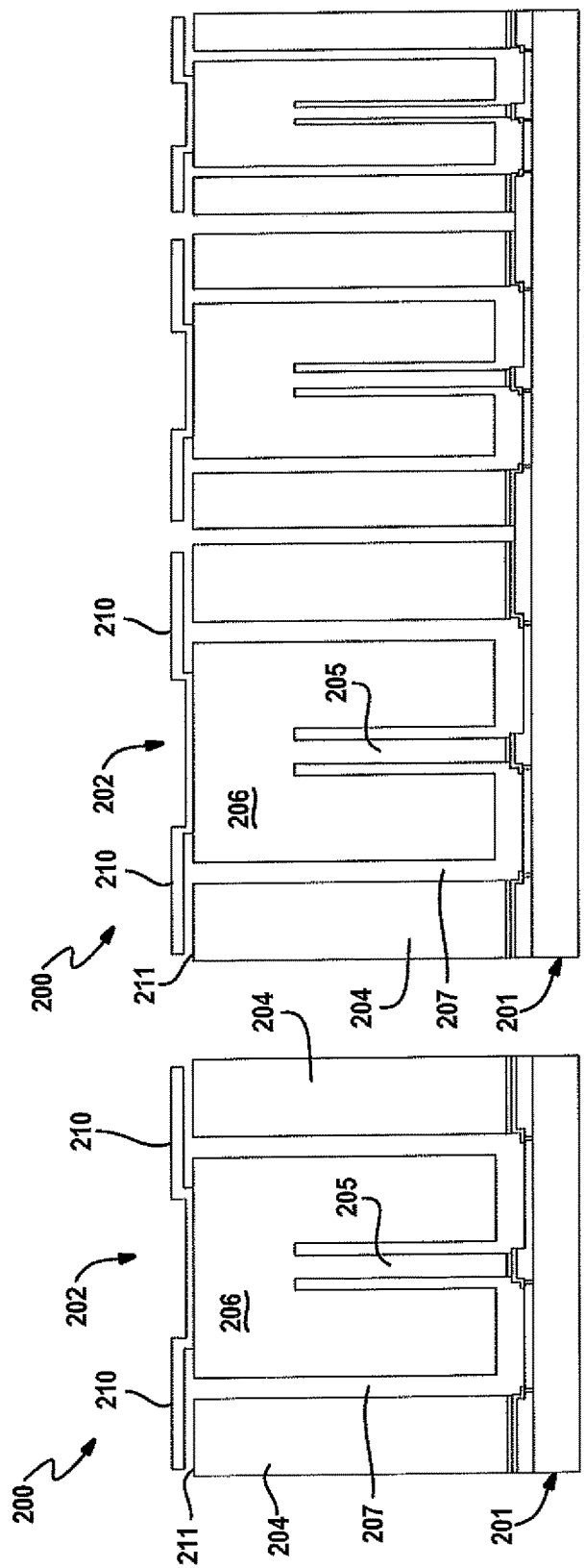

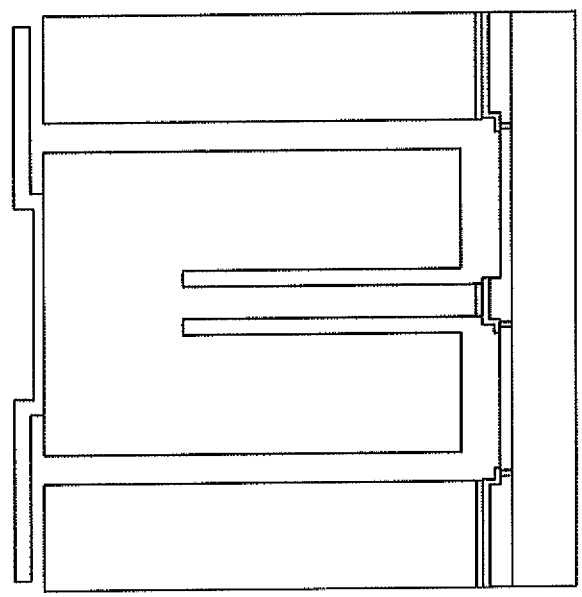
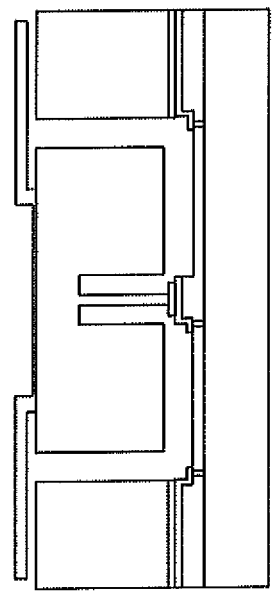
FIG. 27A     FIG. 27B

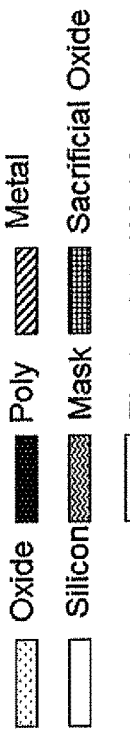
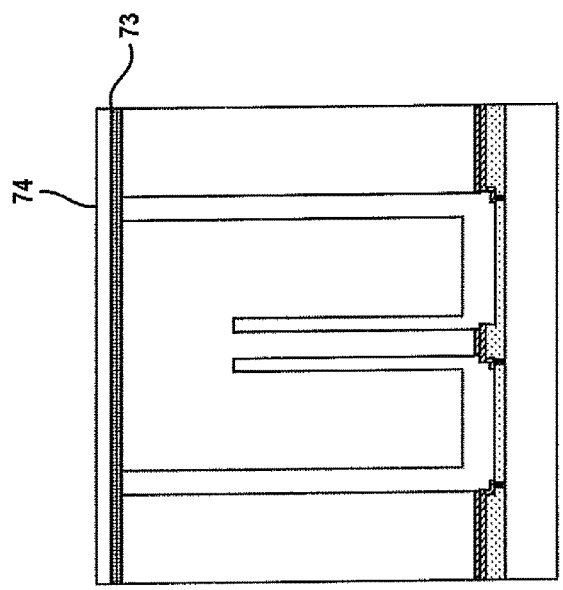
FIG. 28C
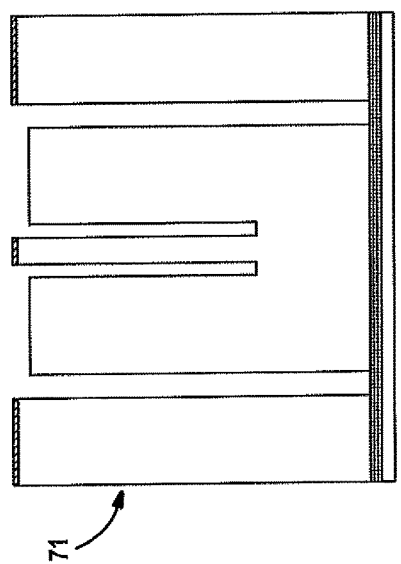
FIG. 28A
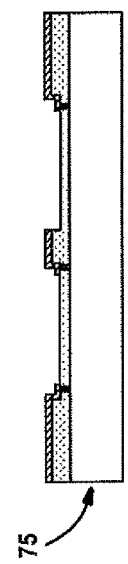
FIG. 28B

▨ Oxide  ▰ Poly  ▨ Metal
☐ Silicon  ▨ Mask  ▨ Sacrificial Oxide
▨ Electroplated Metal

HIGH ASPECT-RATIO LOW NOISE MULTI-AXIS ACCELEROMETERS

CROSS-REFERENCE TO RELATED APPLICATIONS

This application claims the benefit of U.S. Provisional Application No. 62/297,327, filed on Feb. 19, 2016. The entire disclosure of the above application is incorporated herein by reference.

GOVERNMENT CLAUSE

This invention was made with government support under W911NF-08-2-0004 awarded by the U.S. Army/Army Research Laboratory. The Government has certain rights in the invention.

FIELD

The present disclosure relates to techniques for fabricating accelerometers and other types of microstructures having small footprints with high aspect ratios.

BACKGROUND

High sensitivity and low noise are important characteristics of high performance accelerometers since they determine the accelerometer's signal to noise ratio (SNR). Signal to noise ratio indicates directly the resolution or how small of an acceleration signal the accelerometer is able to detect.

The dominant mechanical noise source for a micromachined accelerometer is the molecular Brownian motion. To achieve thermal mechanical noise below 1 $\mu g/\sqrt{Hz}$ and high sensitivity per unit footprint for capacitive accelerometers, efforts have been made toward realizing both large proof-mass, while efforts at increasing the sensitivity to acceleration of a capacitive accelerometer focused on increasing the capacitive sensitivity of the accelerometer by increasing the area and reducing the size of the capacitive gap through creating a high aspect-ratio gap. Increasing the proof-mass size has proven to be the most effective way to reduce the noise. While the sensing gaps need to be reasonably narrow to provide higher sensitivity without compromising the noise performance (increase the air damping).

With the existing technologies, the MEMS device footprint has to be increased to allow for large proof-mass and sense area because the device height is typically limited to ≤500 µm. Silicon on glass (SOG) and CMOS MEMS capacitive accelerometers that demonstrated <10 $\mu g/\sqrt{Hz}$ noise floor have limited proof-mass thickness, typically <150 µm and 5 µm respectively. Thus device footprint has to be increased. A HARPSS-SOI process has also been used to increase proof-mass by utilizing the silicon mass on the backside of the SOI handle wafer (400 µm). Although a noise floor of 200 $ng/\sqrt{Hz}$ is reported, the device footprint is large (49 mm$^2$). There is a need for multi-axis accelerometers with small footprint and sub-µg resolution based on robust CMOS-compatible fabrication technology.

This section provides background information related to the present disclosure which is not necessarily prior art.

SUMMARY

This section provides a general summary of the disclosure, and is not a comprehensive disclosure of its full scope or all of its features.

In one aspect of the disclosure, a transducer is presented with a sensing gap positioned between bottom plane of the proof-mass and the substrate. The transducer includes: a substrate; a transducer structure and one or more sensing electrodes. The transducer structure is mounted on a top surface of the substrate and extends upwardly from the top surface of the substrate. In one embodiment, the transducer structure is comprised of a support beam integrally formed with a proof-mass. The sensing electrodes are mounted to the top surface of the substrate and spatially separated from the transducer structure. The sensing electrodes may be used to measure capacitance across a gap formed between the one or more electrodes and the transducer structure. Motion of the transducer structure causes size of the gap to vary in a direction that is parallel with longitudinal axis of the cantilever beam.

In another aspect, a transducer is presented with a sensing gap positioned near the top of the transducer structure. The transducer includes: a substrate; a transducer structure; one or more stationary electrodes; and one or more sensing electrodes. The transducer structure is mounted on a top surface of the substrate and extends upwardly from the top surface of the substrate. In one embodiment, the transducer structure is comprised of a support beam. The stationary electrodes extend upwardly from the top surface of the substrate and arranged around periphery of the transducer structure. The stationary electrodes are spatially separated from the transducer structure by a channel that extends along entire height of the transducer structure.

In one embodiment, the sensing electrodes are formed on a top surface of the transducer structure. In this case, the sensing electrodes extend radially outward from the transducer structure and overhang at least a portion of a top surface of the one or more stationary electrodes, thereby defining a gap between the one or more sensing electrodes and the top surface of the one or more stationary electrodes.

In another embodiment, the sensing electrodes are formed on a top surface of the one or more stationary electrodes. In this case, the sensing electrodes extend radially inward from the one or more stationary electrodes and overhang at least a portion of a top surface of the transducer structure, thereby defining a gap between the one or more sensing electrodes and the top surface of the transducer structure.

In yet another aspect, a transducer is presented with an extra mass deposited on a top surface of the transducer structure. The extra mass is comprised of a material having a higher density than material comprising the transducer structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4A-4C are diagrams illustrating different geometric shapes for the transducer structure;

FIGS. 5A-5H are diagrams illustrating different configurations for the mass associated with the transducer structure;

FIGS. 7A-7F are diagrams depicting an example implementation of the fabrication method;

FIGS. 15A and 15B are diagrams depicting how to increase proof-mass weight by adding extra mass to the top of the transducer structure in accordance with one aspect of this disclosure;

FIGS. 16A-16C are diagrams showing different configurations for the transducer structure which demonstrate the effectiveness of adding mass;

FIGS. 17A-17C are diagrams depicting example techniques for increasing sensitivity by reducing gap size;

FIGS. 20A-20C are diagrams depicting examples of transducers with a sensing gap positioned between bottom plane of the proof-mass and the substrate;

FIGS. 24A-24D are diagrams depicting an example method for fabricating the transducer shown in FIG. 20B;

FIGS. 25A-25D are diagrams illustrating the addition of an extra mass to improve sensitivity;

FIGS. 26A and 26B are diagrams depicting examples of transducers with sensing electrodes formed on a top surface of the transducer structure;

FIGS. 27A and 27B are diagrams illustrating how the height of a transducer can vary depending on substrate thickness;

FIGS. 28A-28F are diagrams depicting an example method for fabricating the transducer shown in FIG. 26A;

Corresponding reference numerals indicate corresponding parts throughout the several views of the drawings.

DETAILED DESCRIPTION

Example embodiments will now be described more fully with reference to the accompanying drawings.

Figure 1B:
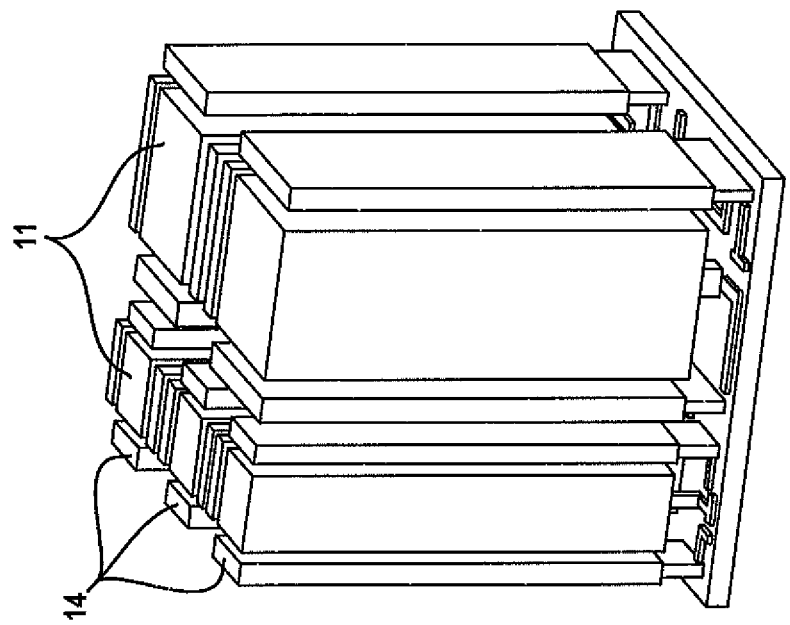
FIG. 1B is an array of transducers having high aspect ratios.
Figure 1A:
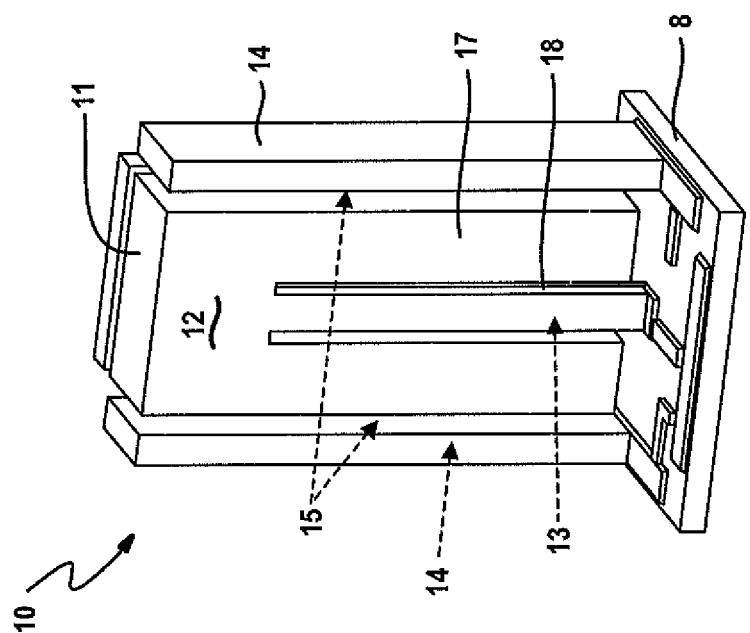
FIG. 1A is a diagram of an example transducer having a high aspect ratio.

FIG. 1A depicts an example transducer 10 with a high aspect ratio in accordance with the teachings of this disclosure. The transducer 10 is comprised of a proof-mass 12 atop a narrow beam 13 to form a transducer structure 11 and one or more electrodes 14 adjacent to the transducer structure. The beam acts as mechanical spring and the proof-mass is separated from the electrodes 15 for capacitive transduction of motion. It is studied as a vertical cantilever beam fixed at the base and the design goal is to enable effective transduction. While reference is made to a transducer such as an accelerometer, it is readily understood that the concepts described here are applicable for constructing other type of MEMS devices as well.

More specifically, the transducer structure 11 is mounted on a top surface of a substrate 8 and extends upwardly from a surface of the top surface of the substrate. In this example, the transducer structure is comprised of a cantilever beam 13 integrally formed with a mass 12 that is attached to the cantilever beam 13. The mass 12 is coupled to the cantilever beam 13 proximate to top of the cantilever beam. The mass 12 includes one or more overhangs 17 extending downward from the top of the cantilever beam 13 and adjacent to one or more vertical surfaces of the cantilever beam 13, such that a slot 18 separates the overhangs 17 from the cantilever beam.

The electrodes 14 are also mounted on the top surface of the substrate and extend upwardly from a surface of the top surface of the substrate. The electrodes 14 are disposed around periphery of the transducer structure with a channel 15 extending entire height of the transducer structure 11 and separating the one or more electrodes 14 from the transducer structure 11.

When the upward beam cross-section is square shaped, for the first bending mode, the spring-mass bends along one of the two orthogonal axes toward one of the four electrodes (x+, x−, y+, y−) when force is exerted. This structure meets the following requirements: small footprint transduction element, high performance and easily tailored structural dimensions, built in large and dense arrays with potential signal processing ability. The transduction gaps and separation trenches can be independently defined from both sides. The fabrication technology is more compatible with proceeding or subsequent processing steps so it will allow the transducer to be easily integrated with complementary metal-oxide-semiconductor (CMOS) integrated circuits (IC) fabricated in foundry.

Figure 2A:
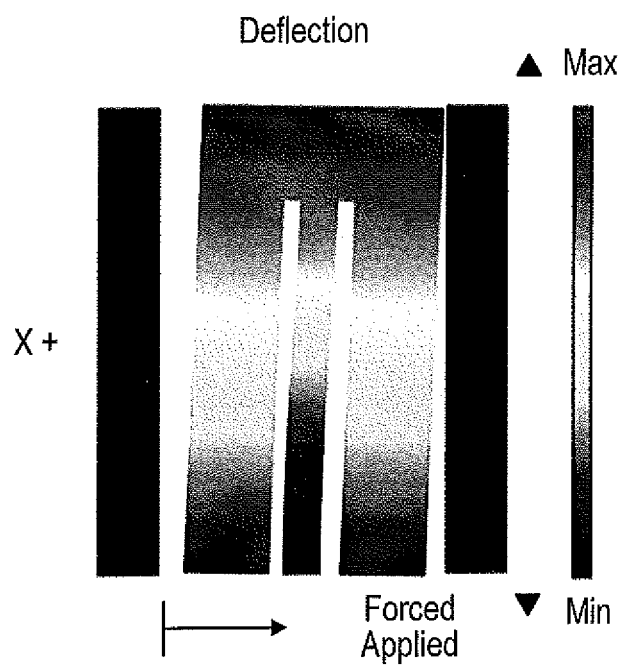
FIG. 2A is an image depicting stress during deflection of the transducer structure.
Figure 2B:
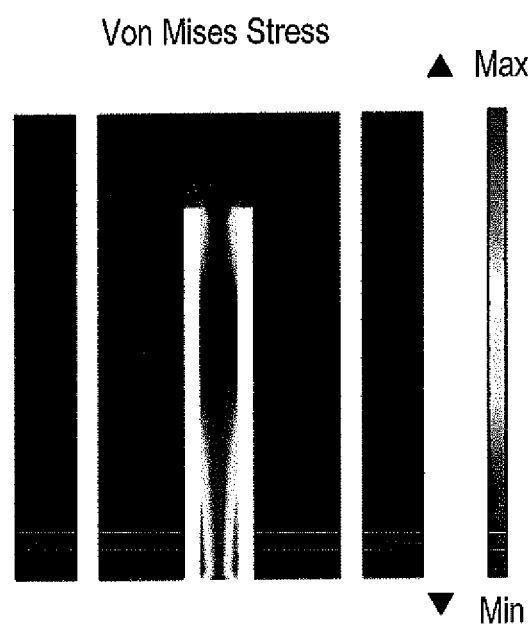
FIG. 2B is an image depicting stress experienced by the transducer structure.
Figure 2C:
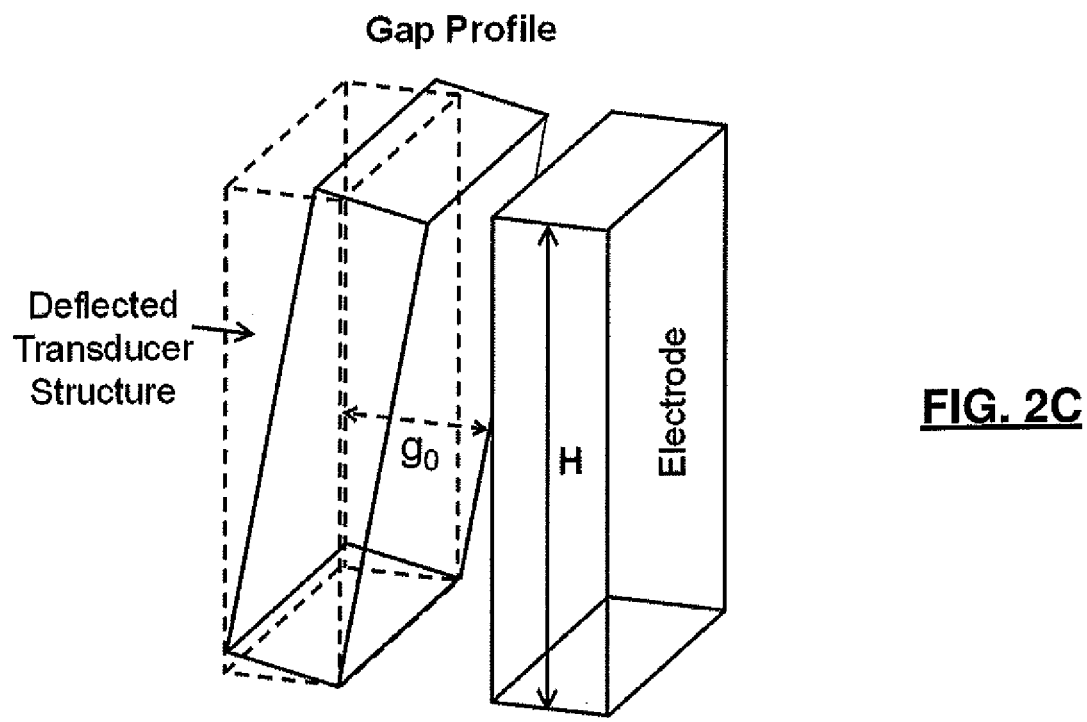
FIG. 2C is a diagram illustrating the gap profile between a deflected transducer structure and adjacent electrodes.

Assuming a device thickness of 500 μm, the transducer is simulated using COMSOL. With reference to FIGS. 2A-2C, force is applied in the x direction and the deflection of the proof-mass and electrodes in the same direction is plotted. Spring length, material properties and mass center determines the displacement profile along the side of the proof-mass. Maximum stress is experienced at the base of the vertical beam as seen in FIG. 2B. For one specific case where the hair structure (the structure is similar to a hair extending upward from the surface and is therefore sometimes referred to as a hair structure) consists of a $300^2$ μm$^2$ footprint 500 μm tall proof-mass, $30^2 \times 400$ μm$^3$ vertical beam, the gap profile (formed by the deflected proof-mass and one of the electrodes) is a trapezoid where the top undergoes maximum deflection as shown in FIGS. 2A and 2C.

The upward spring in the middle can be made very narrow and long, thus it is very compliant and flexible. The electrodes are designed to be much less compliant than the hair-like spring such that they experience deflection more than two orders of magnitude less than the proof-mass on top of the spring. Therefore, the proof-mass may be considered movable and the electrode may be considered as fixed. In the simulated embodiment, both proof-mass and electrodes are fabricated in the same highly-doped bulk silicon that has low resistance so they naturally form the conductive capacitor plates.

Figure 3:
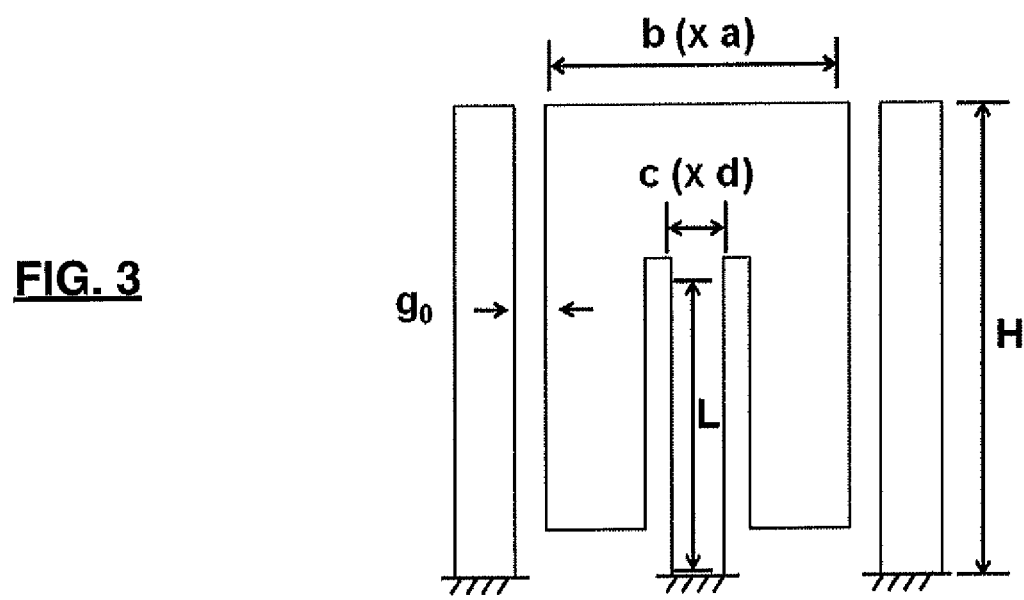
FIG. 3 is a cross-sectional view of an example transducer structure having a uniform gap size.

Critical design parameters are shown in FIG. 3. These parameters include: total device height (H), mass footprint (a×b), spring length (L), spring cross-section area (c×d), and the nominal transduction gap ($g_0$ for uniform gap and $g_{top}$ & $g_{bot}$ for two-gap approach). The displacement along the side of the proof-mass and the maximum displacement at the top of the mass are:

$$\Delta x_{mass}(z) = \Delta x(L) + \Delta x(L)(z - L) \quad (1)$$
$$= \frac{Mass \times Accel.}{k} \frac{1}{2L^2}[3(2h-L)z - (3h-2L)L]$$

$$\Delta x_{mass}(H) = \frac{Mass \times Accel.}{k} \frac{1}{2L^2}(12h^2 - 15Lh + 5L^2), \quad (2)$$

$$h = \frac{L+H}{2}$$

When the proof-mass is displaced under external lateral force, the final gap dimensions at the top and at the bottom are:

$$g_{top}(H) = g_0 - \Delta x_{mass}(H), \quad g_{bot}(0) = g_0 - \Delta x_{mass}(0) \quad (3)$$

Thus the new capacitance reading when force is applied compared to the initial capacitance are:

$$C_1 = \varepsilon \times Area \times \frac{1}{g_{top}(H) - g_{bot}(0)} \ln\left(\frac{g_{top}(H)}{g_{bot}(0)}\right) \quad (4)$$

$$C_0 = \varepsilon \times Area \times \frac{1}{g_0}$$

When the displacement is small, the change in capacitance can be approximated by Taylor expansion as:

$$\Delta C = C_1 - C_0 \approx \frac{1}{2}\varepsilon \times Area \times \frac{Mass}{k} \times \frac{1}{g_0^2} \times Accel. \quad (5)$$

$$\frac{\Delta C}{Accel.} = \frac{1}{2}\varepsilon \times (a \times H) \times \frac{abH}{dc^3/L^3} \times \frac{1}{g_0^2} \quad (6)$$

From Equation (6), one can see that the sensitivity is inversely proportional to $1/g_0^2$ and scales with the proof-mass size (a, b, H), the sensing area (a, H) and the spring dimensions (c, d, L). A taller H also allows for longer vertical spring L. Thus, device height H plays a critical role in improving the sensitivity for this design by utilizing the third dimension.

Figure 18:
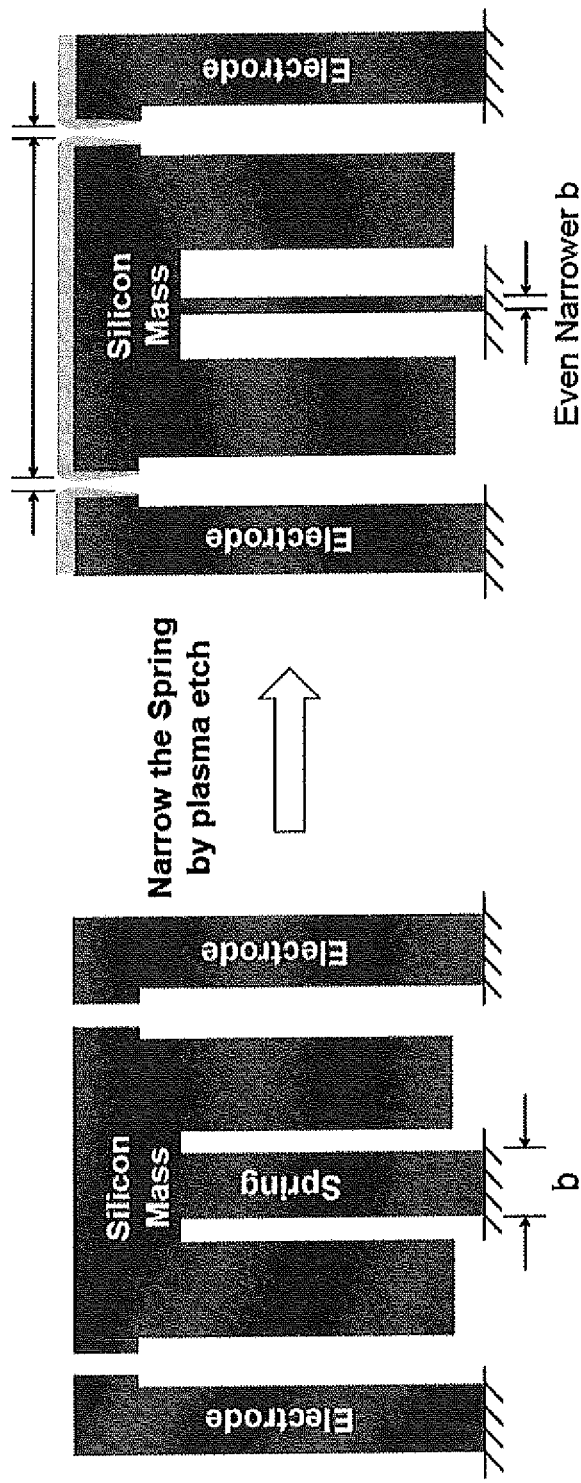
FIG. 18 is a diagram depicting a technique for increasing sensitivity by reducing the spring constant of the transducer structure.

By varying the design parameters (H, L, a, b, c, d, and gap), multi-element arrays of transducers can be built with modulated dimensions. An example array of transducers with varying dimensions can be seen in FIG. 1B. While the electrodes 14 are shown as being on all four sides of a transducer structure 11 having shape of a rectangular cuboid, it is understood that electrodes 14 do not need to surround the transducer structure 11. For example, the transducer structure 11 may be configured with only two electrodes arranged on opposing sides of the transducer structure as seen in FIG. 18. In another example, the transducer structure may be configured with only one electrode adjacent to the transducer structure. Other arrangements with one or more electrodes disposed proximate to the transducer structure also fall within the scope of this disclosure.

The rectangular cuboid shape for the cantilever beam 13 and the proof-mass 12 can easily be modified by varying the mask design to realize different structures. In FIG. 4A, the cantilever beam 13 and the proof-mass 12 are shown as rectangular cuboids. In FIG. 4B, the cantilever beam 13 is a cylinder and the proof-mass 12 is rectangular cuboid. In FIG. 4C, the cantilever beam and the proof-mass are shown as cylinders. Other geometries for these two components are also contemplated by this disclosure.

Figure 5A:
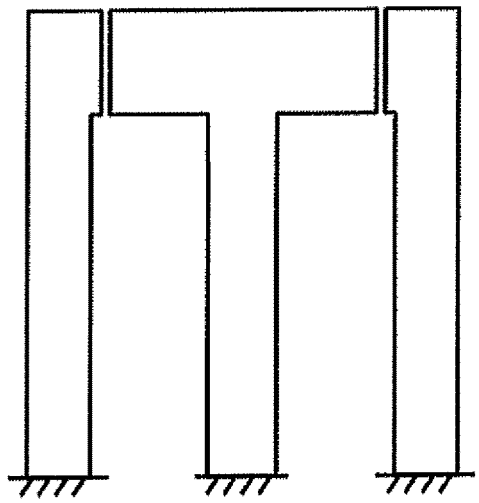
Figure 5B:
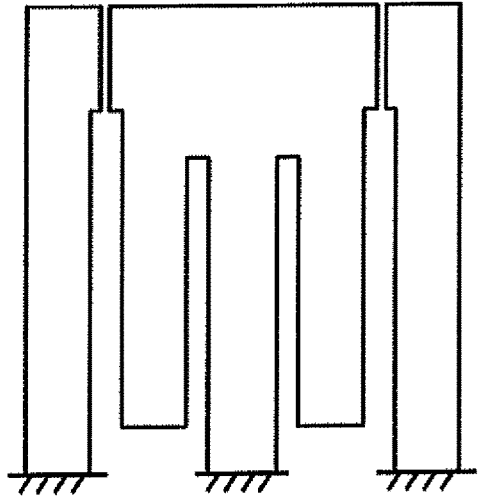
Figure 5C:
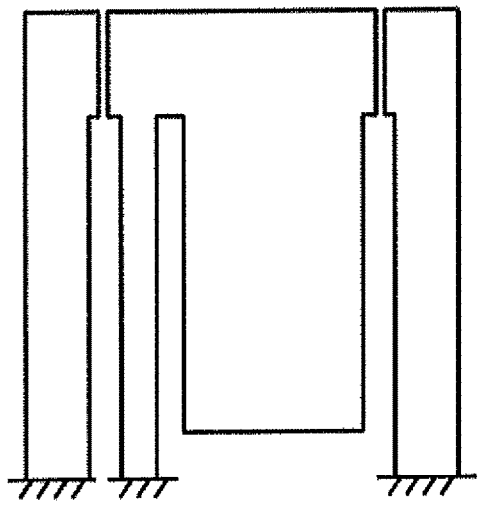
Figure 5D:
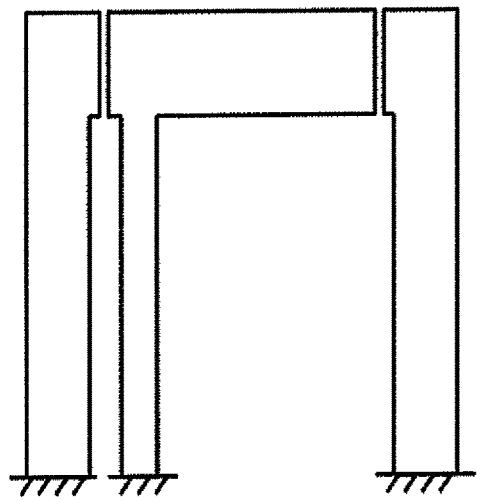
Figure 6:
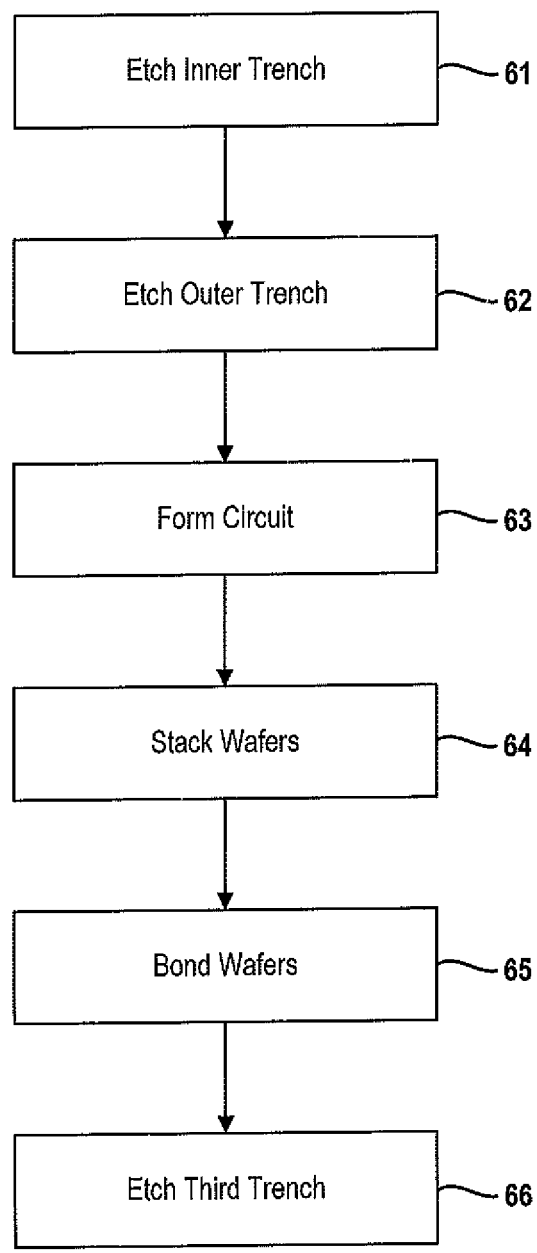
FIG. 6 is a flowchart depicting a method for fabricating a transducer having a high aspect ratio.

FIGS. 5A-5H illustrate different example configurations for the proof-mass 12. In FIGS. 5A and 5B, the mass 12 is symmetric about the beam 13; whereas, in FIGS. 5C-5F, the mass 12 is asymmetric about the beam 13. In FIG. 5A, it is noted that the mass 12 is disposed above the beam 13 and does not extend downward along the vertical surface of the beam 13. In FIG. 5G, the beam 13 serves as the mass. That is, no additional mass is coupled to the beam. While the mass is integrally formed with the beam from the same wafer in these configurations, it is also envisioned that the mass can be a separate piece that is bonded or otherwise coupled to the beam. It is understood that these different configurations are illustrative and this disclosure is not limited thereto.

Due to limitations associated with deep reactive ion etching, gap dimension of less than 3 μm is only achievable for heights ranging from 10 s to 100 μm. Not only the gap height is limited, the device thickness is also limited to the same range. Electrostatic devices also require various gap dimensions for reducing the parasitics to avoid coupling and provide good isolation. With one DRIE step, when large gaps are exposed first, the materials already patterned on the glass substrates will be sputtered or etched. Thus, conventional processes are not applicable for fabricating the proposed transducer.

A method for fabricating a transducer with higher aspect ratios is described in relation to FIG. 6 and FIGS. 7A-7F. A first substrate 71 serves as the start point for fabricating the sensing/actuation structure of the transducer. In an example embodiment, the first substrate 71 is a polished silicon wafer having a height on the order of one thousand micrometers. In preparation, oxide layers 72 may be deposited onto both sides of the silicon wafer as seen in FIG. 7A.

Referring to the FIG. 7B, an inner trench 73 and an outer trench 74 are formed 61, 62 into one (bottom) surface of the first substrate 71. The inner trench 73 defines a cantilever beam for the sensing/actuation structure; whereas, the outer trench 74 defines the mass surrounding the cantilever beam. In the example embodiment, the inner trench 73 and the outer trench 74 are etched concurrently using deep reactive ion etching. It is envisioned that the trenches may be formed independently. Other techniques for forming the trenches are also contemplated by this disclosure.

A second substrate 75 serves as the base for the transducer. A circuit is formed at 63 on the top surface of the second substrate 75 as seen in FIGS. 7C and 7D. In the example embodiment, the circuit is comprised of the bonding pads and the electrical interconnections for the sensing/actuation structure. It is readily understood that different circuit arrangements may be formed depending of the type of MEMS device.

In FIG. 7E, the first substrate 71 is then stacked and bonded 64, 65 to the second substrate 75. In particular, the (bottom) surface in which the inner and outer trenches were formed is faced towards and disposed directly onto the top surface 76 of the second substrate 75. In this way, the cantilever beam extends upwardly from the top surface 76 with the overhangs of the proof-mass extending downward from the top of the cantilever beam. A slot separates the additional sections of the proof-mass from the vertical surfaces of the cantilever beam.

Lastly, a third trench 77 is formed at 66 into the top surface of the first substrate as seen in FIG. 7F. The third trench 77 aligns with the outer trench 74 and is formed to a depth such that the third trench 77 interconnects with the outer trench 74 to form a channel surrounding the sensing/actuation structure, thereby releasing the structure. In the example embodiment, the third trench 77 is etched using deep reactive ion etching although other methods are contemplated as well.

For a better understanding, a particular fabrication method is further described as follows. Starting with a highly doped silicon wafer, a shallow recess (e.g., 6 µm) is patterned and etched into one surface of this first substrate. Cantilever and electrodes anchors are not etched. Oxide layers (e.g., 4 µm) are then deposited on both sides of a highly doped silicon wafer. A patterned photoresist layer on the bottom side is used as a mask for reactive ion etching of the oxide. This mask defines the vertical springs, masses, electrodes and the larger capacitive sensing/actuation gaps $g_{bot}$. The backside oxide layer defines the smaller capacitive sensing/actuation gaps $g_{top}$ during the final DRIE release step. The alignment between the small and large gaps is critical in this step. In this embodiment, the small gaps are located at the top part of the proof mass, which contribute the most to the sensitivity. Larger openings are also patterned to physically separate and electrically isolate the individual mass, electrodes and neighboring sensors.

Inner and outer trenches with different depths are formed by deep reactive ion etching, using different trench opening sizes and taking advantage of the DRIE lag. Following that, the oxide on the front side is removed and a blanket stack (e.g., Cr/Au 200 Å/3000 Å) is evaporated on the front side to serve as Si—Au eutectic bonding inter-layer and prevent the silicon surface from being oxidized prior to bonding.

For the device base, a lightly doped wafer is covered with a layer of LCPVD oxide (e.g., 4 µm). The oxide is patterned using photoresist. This oxide is used as a passivation layer. Recesses (e.g., 3 µm) are formed on the oxide to further suspend the proof mass and separate individual sensor. To form a detection circuit, in-situ doped polysilicon (e.g., 0.6 µm using LPCVD) is deposited and patterned for electrical interconnections. Additionally, oxide passivation (e.g., 1 µm using PECVD) is patterned to protect the polysilicon interconnects from the subsequent DRIE release step. A metal layer (e.g., 1 µm of Au) is deposited and lifted off to define the eutectic bond pads and connections.

Next, the two wafers are aligned and brought in contact before being placed in a bonder (e.g., SUSS SB6e bonder). In this example, Si—Au eutectic bonding is used to anchor the vertical springs and sidewall electrodes to the base substrate although other types of bonding techniques may be used as well.

Finally, the small gaps $g_{top}$ are formed from the top by deep reactive ion etching. Dry etch of the remaining oxide mask is followed by blanket deposition of metal for contact and electrical testing. This method results in small effective sensing gaps where needed and achieves device thickness beyond the typical 500 µm. While the above fabrication method has been described with specific components having specific values and arranged in a specific configuration, it will be appreciated that this method may be implemented with many different configurations, components, and/or values as necessary or desired for a particular application. The above configurations, components and values are presented only to describe one particular embodiment that has proven effective and should be viewed as illustrating, rather than limiting, the present disclosure.

Figure 8:
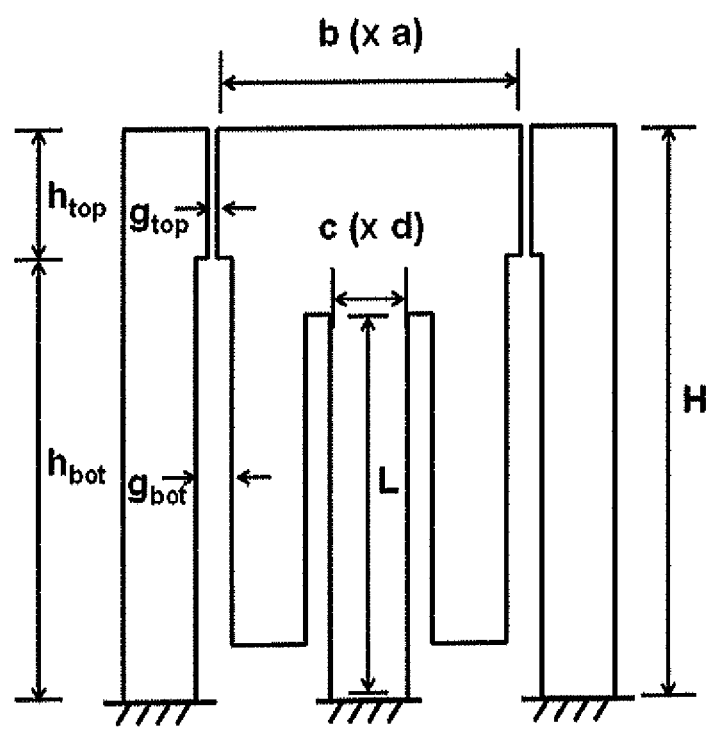
FIG. 8 is a cross-sectional view of an example transducer structure having a channel with different width sections.

FIG. 8 shows the critical dimensions of the 2-gap structure for the proposed transducer. All the lateral gap dimensions are independently defined from both sides of a single wafer to form the spring height (L), top gap height ($h_{top}$), top sensing gap ($g_{top}$), bottom gap height ($h_{bot}$), bottom sensing gap ($g_{bot}$); either of the two sensing gaps $g_{top}$ and $g_{bot}$ can be made ultra-high aspect ratio to optimize for sensitivity and electrical tunability.

In some embodiments, the transducer structure has a height on the order of 100 micrometers (e.g., 100-150 micrometers). In such embodiments, the aspect ratio of the height of the transducer structure to the narrow section of the gap is greater than 100 and preferably greater than 200. For example, for a transducer structure with a height of 100 micrometers, the narrow section of the gap may be formed in the range of 0.2-1 micrometers (and preferably less than 1 micrometer). Thus, a transducer structure with a height of 100 micrometers with a gap width of 0.5 micrometers has an aspect ratio of 200. Similar values may apply to transducer structures with a uniform gap width as well. It is readily understood that the narrow section of the gap may be near the top of the structure, near the bottom of the structure or a combination thereof.

In other embodiments, the transducer structure has a height greater than 500 micrometers (e.g., in the range of 500-2000 micrometers). In such embodiments, the aspect ratio of the height of the transducer structure to the narrow section of the gaps greater than 250 and preferably greater than 300. For example, the transducer structure may have a height on the order of 500 micrometers with the narrow section of the gap in the range of 2 to 5 micrometers and preferably around 2-3 micrometers. In another example, the transducer structure may have a height on the order of 1000 micrometers with the narrow section of the gap in the order of 3 micrometers. These examples are merely illustrative of the combinations of heights and widths that may yield transducers with high aspect ratios.

Figure 9:
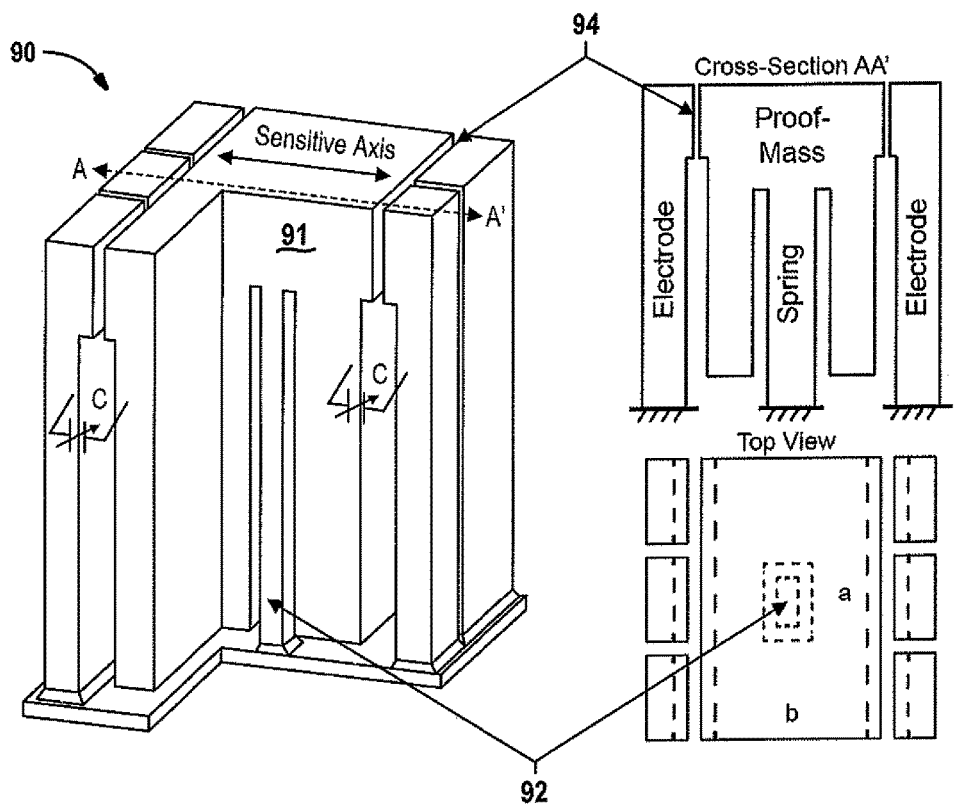
FIG. 9 is a diagram of an example accelerometer having a high aspect ratio.
Figure 10:
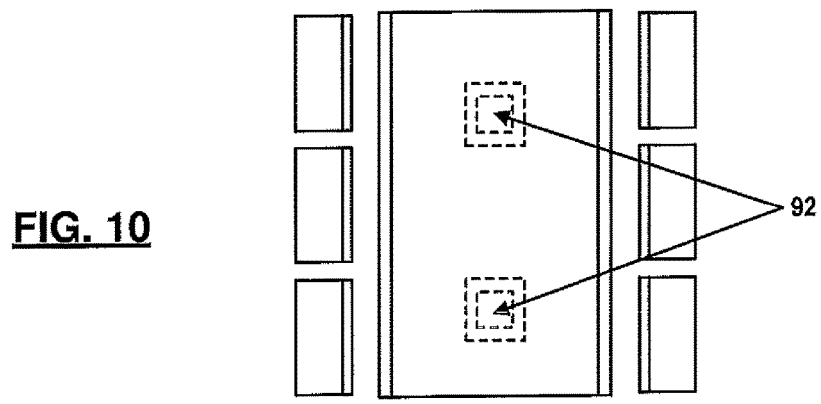
FIG. 10 is a cross-section top view of an example accelerometer having a double-spring arrangement.

Referring to FIG. 9, a new capacitive accelerometer 90 with increased device height (1 mm, 1.5 mm, etc.), and a narrow high aspect-ratio (HAR) transduction gap is presented. The accelerometer 90 is based on the novel 2-gap capacitive fabrication technology described above. Each accelerometer structure has a thick silicon proof-mass 91 supported by a vertical spring 92, located at the center of the proof-mass and surrounded by multiple sense/feedback electrodes 93. The electrodes 93 are separated from the transducer structure by capacitive transduction gaps 94. Multiple electrodes are implemented to enable fully symmetric differential readout, and provide force feedback for closed-loop operation. Double-spring 92 may also be used instead of a single spring to reduce cross-axis sensitivity as shown in FIG. 10.

Critical design parameters are: device height/proof-mass height H and footprint area (a×b), spring length L and cross-section (c×d), and the two-part transduction gaps. The top gap $g_{top}$ extends a height of $h_{top}$ and the bottom gap $g_{bot}$ extends a height of $h_{bot}$. Since the top of a vertical inverted pendulum (proof mass) undergoes the maximum deflection under applied lateral (in plane) inertial force, the gap profile can be approximated as a trapezoidal shape when force is applied and the capacitance is expressed as (with bases $d_1$ and $d_2$):

$$C = \varepsilon A \frac{1}{d_1 - d_2} \ln\left(\frac{d_1}{d_2}\right) \quad (7)$$

When the displacement is small, the change in capacitance of a single gap can be written as:

$$\Delta C = C_1 - C_0 \approx \varepsilon A \frac{m \cdot accel./k}{2g_0^2} = \frac{1}{2}\varepsilon \times WH \times \frac{m_{eff}}{k_{eff}} \times accel. \quad (8)$$

Applying this to a two-gap accelerometer design, the capacitive sensitivity (S) of the accelerometer 90 is highly dependent on the gap dimensions, the proof-mass size and spring dimensions. From Equation (10) and (11), it is shown that the sensitivity scales with H. The device height plays a critical role in improving the sensitivity for this accelerometer design by utilizing the third dimension. H=1 mm provides large proof-mass (>2.33 milligram/mm²) and can be further increased by using thicker silicon wafers (1.5 mm, 2 mm, etc.).

$$\Delta C_{total} = \Delta C_{top} + \Delta C_{bot} \quad (9)$$

$$S = \frac{\Delta C_{total}}{\Delta acccel.} \propto \frac{1}{2}\varepsilon \times \left(h_{top}\frac{m_{eff}}{k_{eff}}\frac{1}{g_{top}^2} + h_{bot}\frac{m_{eff}}{k_{eff}}\frac{1}{g_{bot}^2}\right) \quad (10)$$

$$m_{eff} \propto a \times b \leq H, k_{eff} \propto \frac{c^3 d}{L^3}, L \propto H \quad (11)$$

The Brownian noise associated with the squeeze film damping effect in air increases significantly with reduction of the gap size so one should not reduce the gap indefinitely. While the proof-mass size has proven to be the more effective design parameter since both sensitivity and Brownian Noise Equivalent Acceleration (BNEA) are improved.

$$BNEA = \sqrt{\frac{4k_B TD}{M^2}} = \sqrt{\frac{4k_B T\omega_0}{MQ}} \propto \frac{1}{gap^{3/2}} \quad (12)$$

Tall device, narrow gap, and long/thin vertical springs are needed for improved sensitivity and reduced BNEA. In the design, the gap definition and proof-mass size definition are weakly dependent. Both $g_{top}$ and H can be optimized without compromising the sensitivity or the mechanical noise floor, realized by the two-gap process.

Figure 11A:
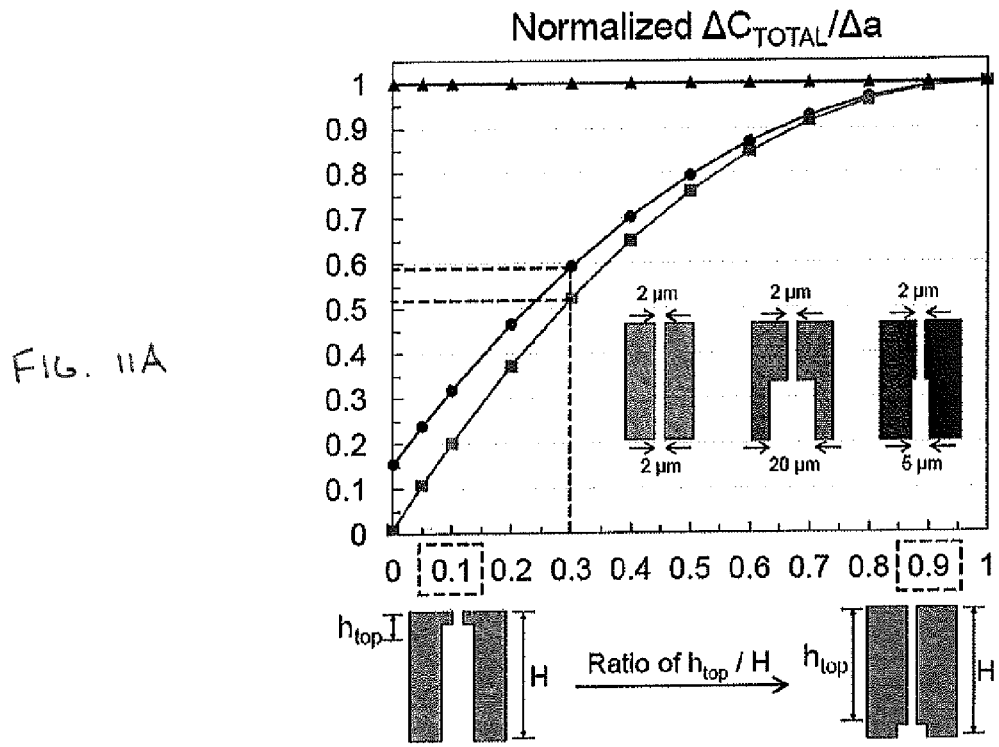
FIGS. 11A and 11B are graphs depicting sensitivity and contribution of $\Delta C_{top}$ to the $\Delta C_{total}$, respectively, for different gap profiles.
Figure 11B:
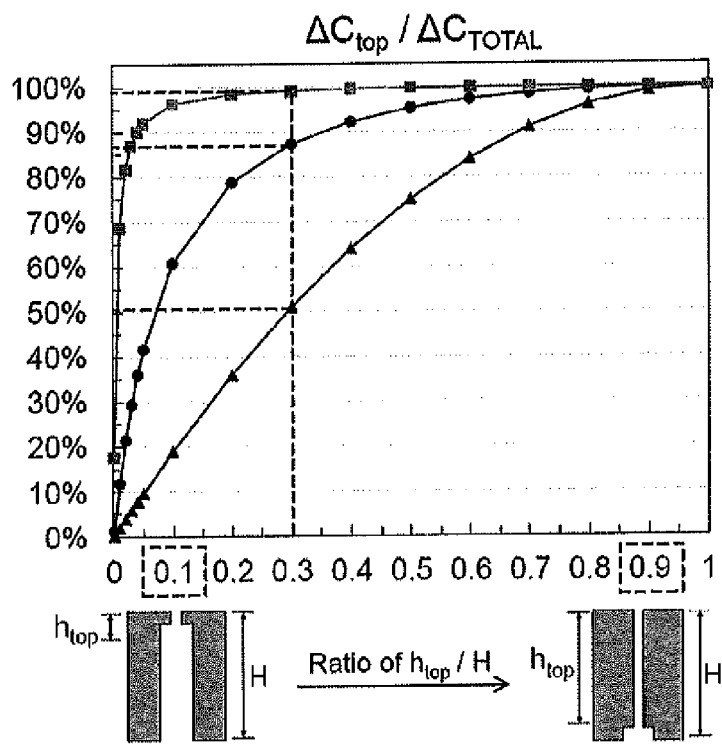

The top of a vertical inverted pendulum (proof-mass) undergoes the maximum deflection under applied in-plane force. COMSOL simulation of various gap profiles verified that the capacitive sensing gap near the top of a vertical capacitive transducer ($g_{top}$) contributes a larger fraction of the total change in capacitance, $\Delta C_{total}$, as seen in FIGS. 11A and 11B. An ultra-high aspect-ratio DRIE process was developed for achieving >100:1 aspect-ratio for gap sizes down to 2 µm.

For a uniform gap ($g_{top}=g_{bot}=2$ µm), the top 30% ($h_{top}$/H=0.3) of the gap contributes >50% of $\Delta C_{total}$ (black). For $g_{top}=2$ µm, $g_{bot}=20$ µm and $h_{top}$/H=0.3, $\Delta C_{top}/\Delta C_{total}$ is >90% (red) and $\Delta C_{total}$ is >50% of a 2 µm uniform narrow gap profile. Therefore, to achieve high sensitivity, one does not need to etch a narrow gap through the entire device height. A narrow gap near the top of a tall device is sufficient to improve sensitivity. The device height (H) is not limited by DRIE etch and can be greatly increased by allowing a wider $g_{bot}$. The new design allows all the critical structural dimensions to be independently varied.

Figures 12A, 12B:
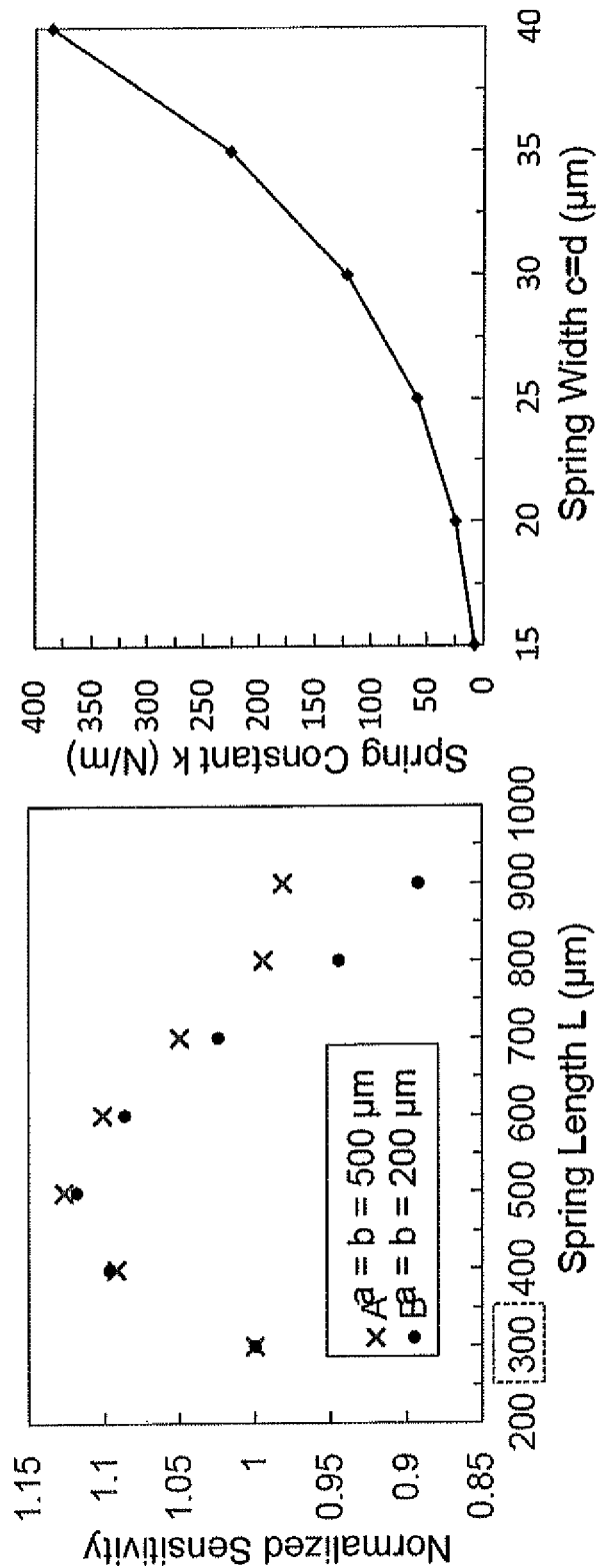
FIG. 12A is a graph showing normalized sensitivity as a function of spring length.
FIG. 12B is a graph showing spring constant as a function of spring width.

FIG. 3 shows the cross-sectional SEMs of a 1-mm tall accelerometer with a vertical spring length, L. Different spring lengths L can be easily achieved by utilizing DRIE lag. In FIG. 12A, setting L≈500-600 µm places the anchor point of the spring midway along the height of the proof-mass, thus increasing displacement near the top where the changes in the narrow gap contribute the most to total ΔC and increasing sensitivity. The minimum spring width (b and c) is limited by the minimum area required for reliable eutectic bonding. If both b and c is designed to be <25 µm, the spring constant will be less 50 N/m as seen in FIG. 12B.

Figure 13A:
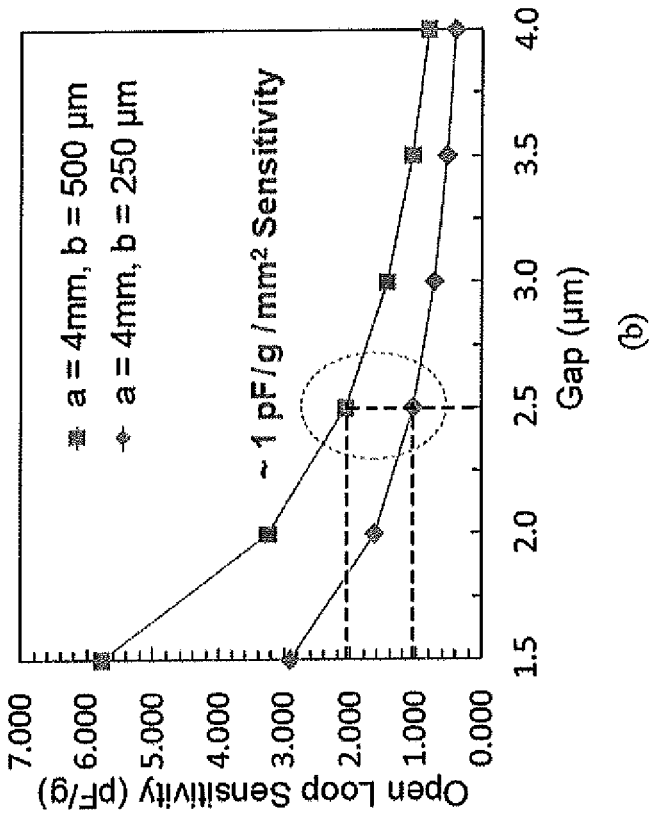
FIGS. 13A and 13B are graphs showing simulation results for optimizing the capacitive gap size for minimizing BNEA and maximizing capacitive sensitivity, respectively, for a sensor footprint of 1 mm$^2$ and 2 mm$^2$.
Figure 13B:
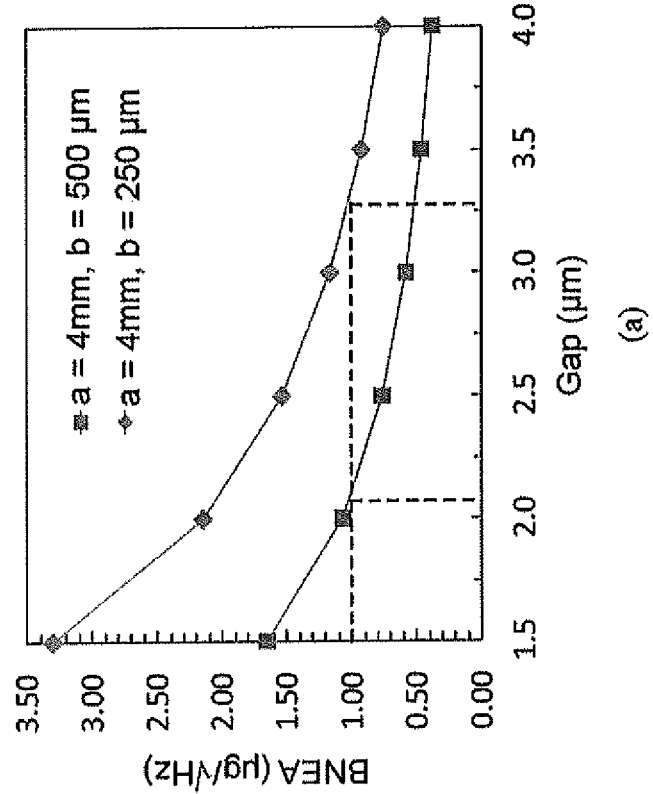

In one example embodiment, various design parameters for the accelerometer 90 are optimized, targeting high capacitive sensitivity (S) and sub-µg/√Hz BNEA for a sensor footprint at 1 mm² and 2 mm². The 1 mm² footprint sensor is designed to have a proof-mass area of 4 mm×250 µm while the 2 mm² footprint sensor has a proof-mass area of 4 mm×500 µm. In both devices, 4 mm is the sense capacitor width. Other design parameters are as follows: H is 1 mm, c is 20 µm, d is 30 µm and L is 600 µm. FIGS. 13A and 13B present the calculated BNEA and COMSOL simulated sensitivity (S) for these two designs. A gap opening less than 2 µm will defeat the purpose to achieve BNEA of <1 µg/√Hz. 2-3 µm is favorable for the 2-mm² sensor and 3.3-4 µm is desired for the 1 mm² sensor to achieve sub-µg noise performance. In the meantime, a 2.5-µm gap allows both sensors to achieve high capacitive sensitivity of greater than 1 pF/g per 1 mm² footprint.

One way to use this structure to sense z-axis acceleration is by detecting the resonant frequency shift. The resonant frequency of the mass-spring will decrease under the compressive force, while it increases under the tensile force. The magnitude of the z-axis input acceleration will be calculated from the resonant frequency shift. The multiple electrodes with narrow gap can be used for driving and sensing.

Silicon is widely used in a variety of commercial electronic products because of its well-established electrical properties and material properties. However the density of silicon is 2.32 g/cm³ and this is relatively low compared to iron, nickel and other metals. For MEMS accelerometers, increasing the proof-mass has been proved to be the most effective way to reduce the thermal mechanical noise below 1 µg/√Hz.

Figure 14A:
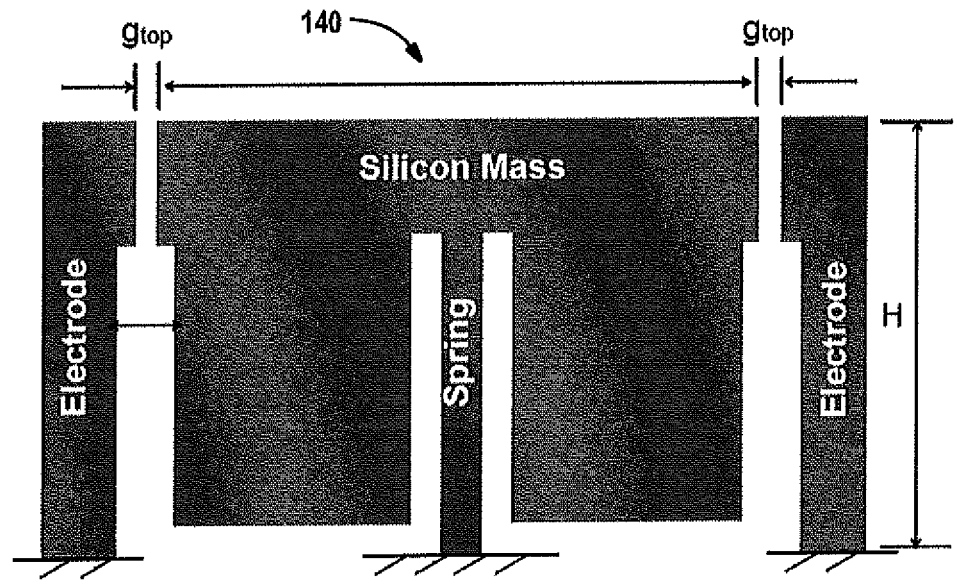
FIGS. 14A-14D are diagrams depicting how to increase the proof-mass weight in accordance with one aspect of this disclosure.
Figure 14B:
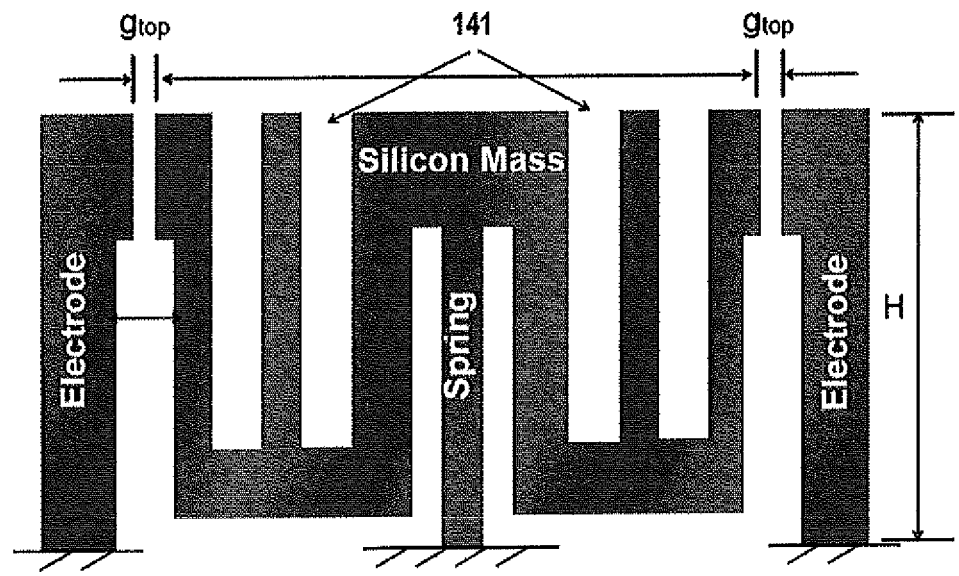
Figure 14C:
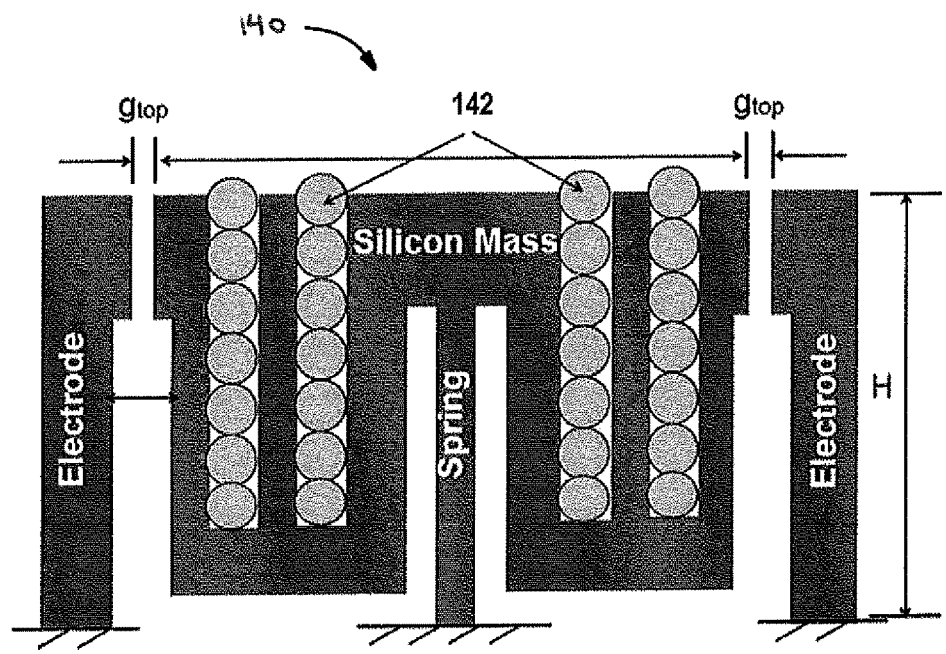
Figure 14D:
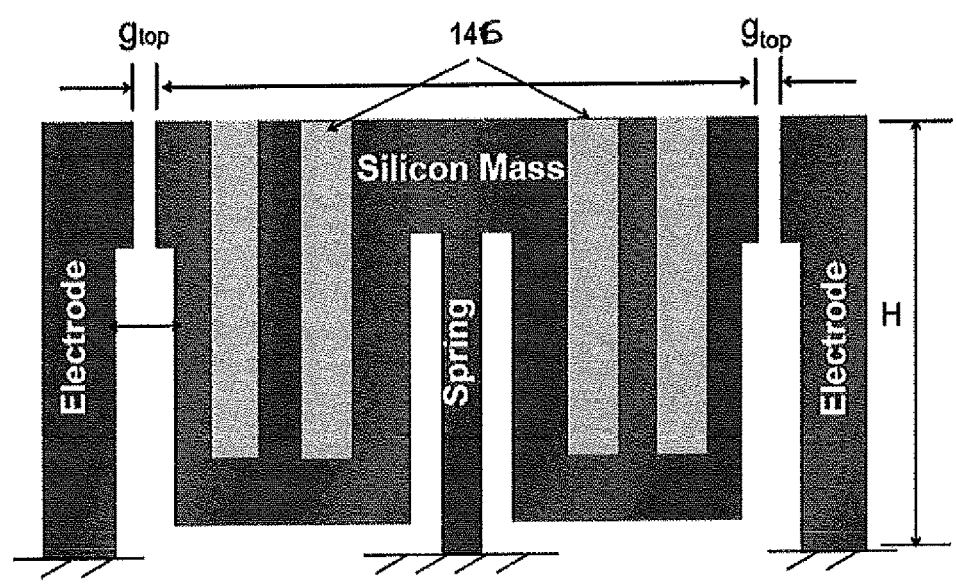

Entirely replacing the silicon material will pose many challenges in device design, long-term device stability, readout design and fabrication options while replacing part of proof-mass by a denser material can be realized. FIGS. 14A-14D illustrate one method for increasing proof-mass size in a transducer structure 140. A transducer structure 140 after small gap formation is shown in FIG. 14A. In FIG. 14B, holes or trenches 141 are etched into the top surface of the transducer structure. It is envisioned that the holes/trenches 141 may be formed concurrently with the top gaps or in a separate step thereafter. The holes/trenches are then filled with a material having higher density than silicon or another material used to form the transducer structure. In one example, un-melted solder spheres 142 are placed into the holes/trenches 141 as seen in FIG. 14C. In another example, solder balls are reflowed to fill in the holes/trenches as seen in FIG. 14D.

Solder spheres available in the market have a broad diameter range from 40 µm to several hundred micrometers. SnAgCu, SnAg, AuSn and InSn are some of the most common solder alloys for flip chip and other IC interconnection applications that can potentially be used in this method. If 75% of H=1 mm can be etched along the vertical direction and 75% of the footprint of the original silicon mass is replaced by a material (e.g., metal) that is 5× as dense as Si, then the new effective mass would be 3× the original value. Other example materials include but are not limited to iron, nickel and other metals.

Another way to increase the size of the proof-mass is to add an extra mass 151 onto the top surface of the transducer structure 150 as shown in FIGS. 15A and 15B. In one example, a metal or another material having a higher density than silicon is electroplated on top of the silicon proof-mass. The electroplated metal block could have the same or a slightly smaller footprint than the underlying silicon part, and could assume a height of h. Referring to FIGS. 16A-16C, COMSOL analysis was used to study the effectiveness of adding different materials.

|  |  |  | (c) Extra mass of different materials | | | |
| --- | --- | --- | --- | --- | --- | --- |
|  | (a) | (b) | Si | Au | Cu | Al |
| Normalized ΔC/g | 1 | 19.93 | 6.34 | 49.10 | 22.20 | 7.20 |

Heavier metals will more effectively increase the mass, as the extra block height h increases the center of mass moves higher relative to the vertical spring top end. The electroplating process is more established for some metals than the others before maximum thickness is reached.

Figure 17C:
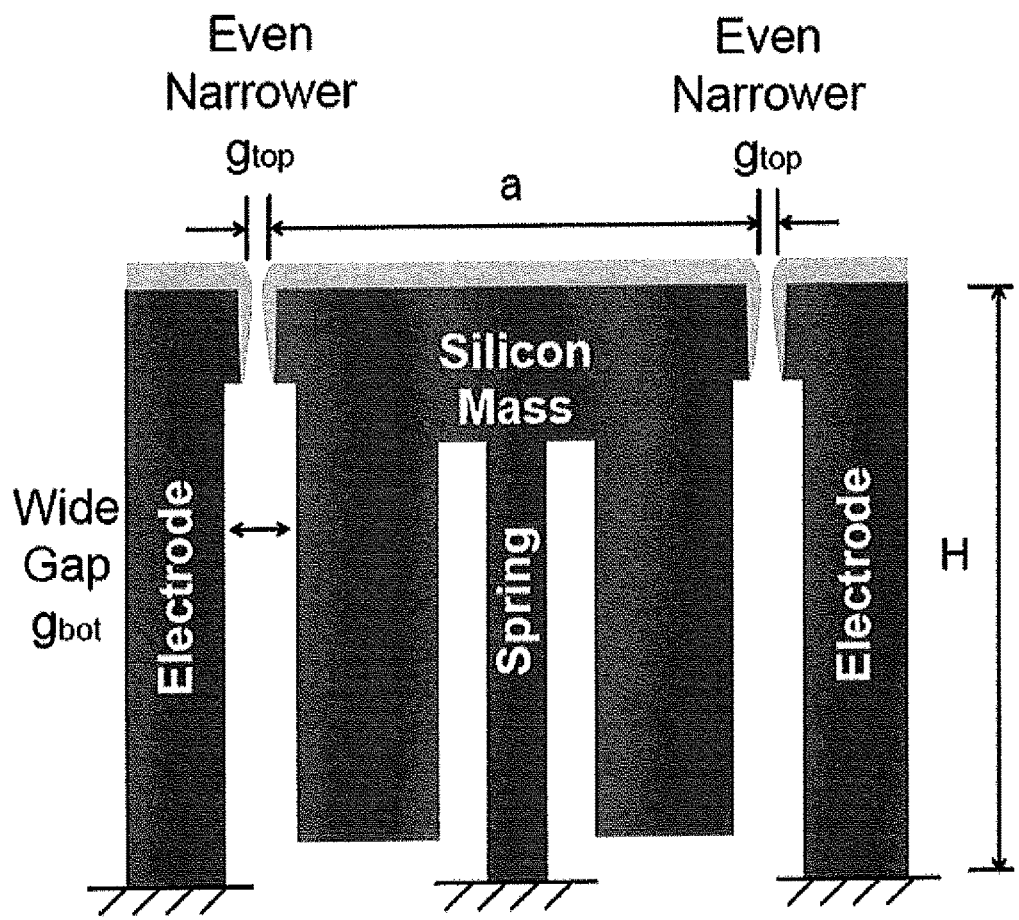

Sensitivity of the accelerometer can be increased by reducing the size of the gap between the sensing electrodes and the transducer structure. In one example, $g_{top}$ can be further reduced to 1-1.5 µm by conformal deposition of in-situ doped poly-silicon as indicated at 171 in FIGS. 17A and 17B. The small gap $g_{top}$ can also be reduced by conformal deposition of metals or other conductive material as shown in FIG. 17C.

Sensitivity of the accelerometer can also be increased by reducing the spring constant of the cantilever beam. For example, the spring width (b) may be narrowed by gas-phase anisotropic etch after the spring is initially defined by the first deep DRIE as seen in FIG. 18. In this example, initial 30×40 µm² spring cross-section may be reduced to 20×30 µm² and initial 20×30 µm² may be reduced to 10×20 µm². It is understood that these dimensions are illustrative and not intended to be limiting.

Figure 19:
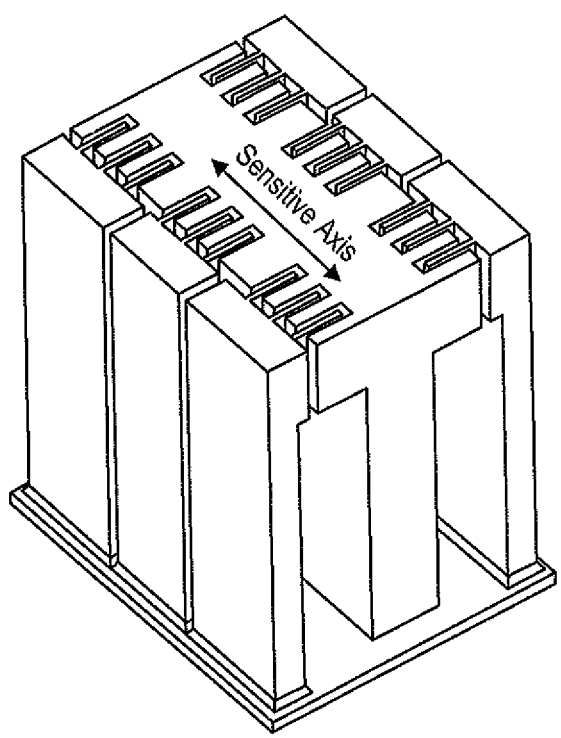
FIG. 19 is a diagram illustrating an accelerometer with interdigitated electrodes.

In another aspect of this disclosure, interdigitated electrodes can be formed instead of only one capacitor on the side as seen in FIG. 19. With optimization of the gaps, electrode width and electrode length, the capacitive sensitivity per unit chip footprint can be further increased.

In yet another aspect of this disclosure, sensing can occur at the bottom of the proof-mass as seen in FIGS. 20A-20C. As described above, the transducer 200 includes a substrate 201, a transducer structure 202, and one or more sensing electrodes 203. The transducer structure 202 is mounted on a top surface of the substrate and extends upwardly from the top surface of the substrate 201. The transducer structure 202 is comprised of a support beam 205 integrally formed with a proof-mass 206.

Unlike previous arrangements, one or more sensing electrodes 203 are mounted to the top surface of the substrate 201 and spatially separated from the transducer structure 202. Thus, the sensing gap 206 is formed between a bottom surface 207 of the proof-mass facing the top surface of the substrate and the top surface of the substrate 201. The one or more sensing electrodes 203 are configured to measure the change of this gap formed between the one or more electrodes 203 and the transducer structure 201, such that size of the gap 206 varies along an axis that is parallel with longitudinal axis of the support beam 205 due to the motion of the transducer proof mass.

In one embodiment, this gap between the bottom surface of the proof-mass and the top surface of the substrate is less than one micrometer after bonding. In another embodiment, this gap between the bottom surface of the proof-mass and the top surface of the substrate is several micrometers after bonding.

For this inverted pendulum mass-spring design, the displacement of the bottom surface of the proof-mass along the vertical direction is comparable to the lateral displacement of the proof-mass in the direction parallel to the substrate surface. Therefore, gap change close to the substrate at the base can be substantial. Methods for detection of the gap change include but are not limited to: measuring capacitance change, detecting an electrical short caused by contact of the two sides of the gap, or measuring the variations in the tunneling current between the proof mass and the electrode when the gap is very small.

Precise gap definition can be achieved by silicon/oxide RIE, sacrificial layer patterning and removal, and metal deposition/pattern. As described in relation to FIGS. 7A-7F, this gap may be well controlled by RIE of the silicon or the passivation oxide, and very precise metal deposition.

No stationary side electrodes or vertical separation between the one or more stationary side electrodes and the transducer structure is needed, thus greatly reducing the footprint and increasing the packing density. Arrays of transducers of the same size can be closely built side by side using high aspect-ratio deep reactive ion etching, and separated by minimum distance high aspect-ratio deep reactive ion etching (HAR DRIE) as seen in FIG. 20B. Arrays of transducers of different sizes can also be closely fabricated side by side using high aspect-ratio deep reactive ion etching (HAR DRIE), and separated by minimum distance as seen in FIG. 20C.

Figure 21C:
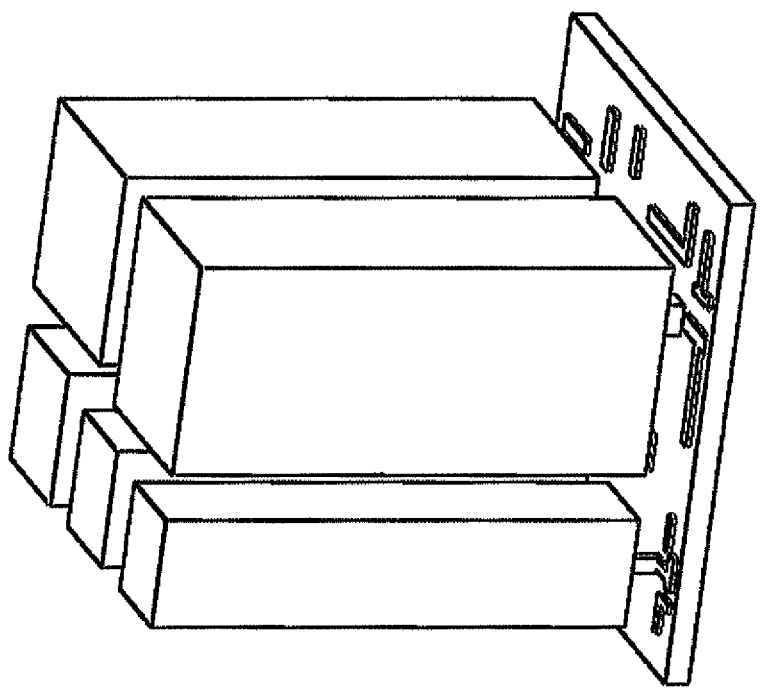
FIG. 21C is a diagram depicting an array of transducers of different sizes.
Figure 21B:
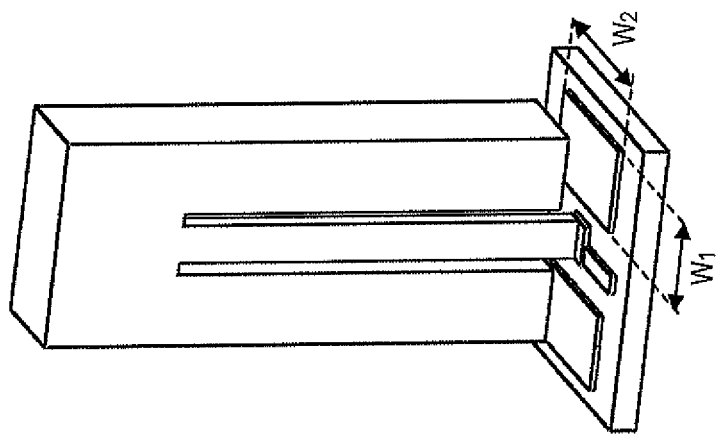
FIGS. 21A and 21B are cross-section views of a transducer with a sensing gap positioned between bottom plane of the proof-mass and the substrate.
Figure 21A:
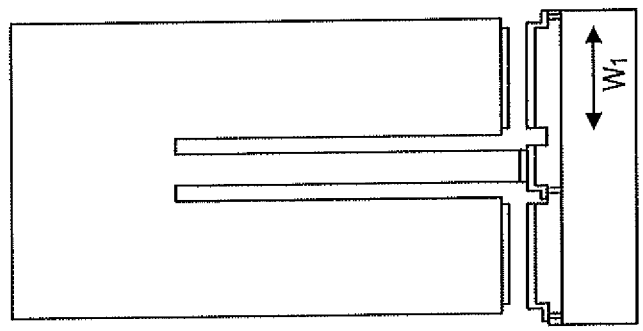

FIGS. 21A and 21B show a cross-section view of one transducer. Since the width of the proof-mass along the sensitive axis (parallel to the substrate) has a finite dimension (W1) to achieve a large mass, the large area W1×W2 can be utilized at the bottom of the proof-mass for sensing the gap change. Compared to arrays with stationary side electrodes, this structure can substantially reduce the footprint and increase the packing density as shown in FIG. 21C.

Figure 22A:
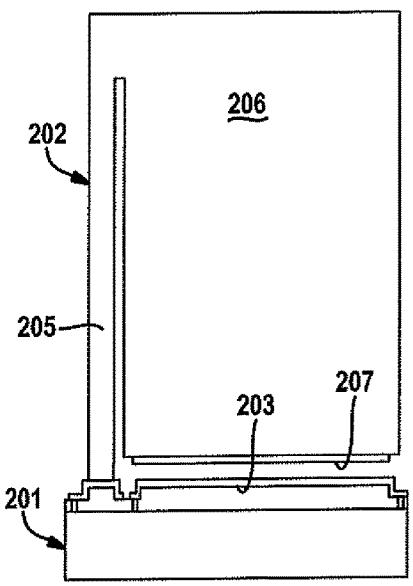
FIGS. 22A and 22B are diagrams depicting transducers with asymmetric arrangements.
Figure 22B:
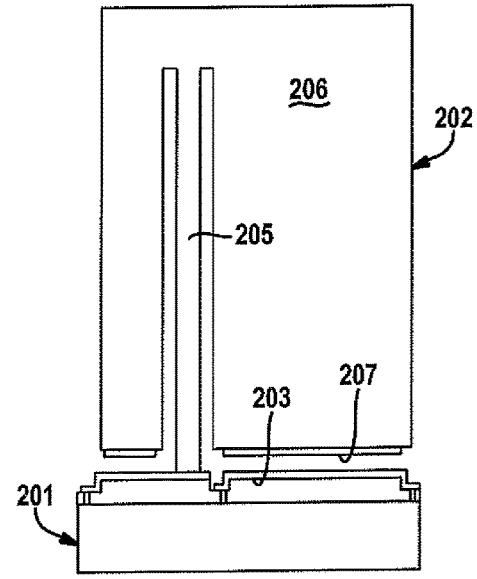

In yet another aspect of this disclosure, FIGS. 22A and 22B show a cross-sectional view of the transducer 200 where the proof-mass 206 is not centered on the support spring 205, or not symmetrical with respect to the support spring 205. The sensing gap is formed between the substrate 201 and proof-mass 206 as described above in relation to FIGS. 20A-20C. The spring can be on one side of the mass as seen in FIG. 22A, or the spring can be within the mass but off-centered as seen in FIG. 22B. Other asymmetric arrangements are contemplated by this disclosure.

Figure 23A:
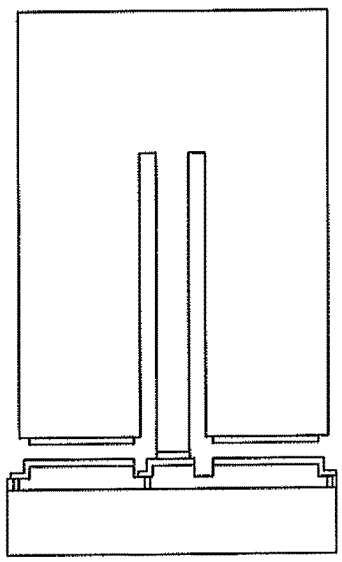
FIGS. 23A and 23B are diagrams illustrating the height of a transducer can vary depending on substrate thickness.
Figure 23B:
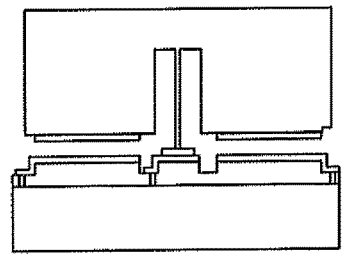

FIGS. 23A and 23B show that the height of the transducer can be varied depending on the substrate thickness. Both structures are able to achieve high sensitivity and low noise for accelerometer design. Again, the sensing gap is formed between the proof-mass and the substrate. The support beam can be made very thin with a high aspect-ratio. For example, 1 mm thick device could be built with a beam that is 900 µm long and 20 µm wide as shown in FIG. 23A; or 100 µm thick device could be built with a beam that is 80 µm long and 2 µm wide as shown in FIG. 23B. It is understood that these dimensions are merely illustrative.

Referring to FIGS. 24A-24D, an example method is set forth for fabricating the transducer 200 described above. The transducer is formed without additional side electrodes around the periphery of each transducer structure but otherwise may be implemented in the same manner as described in relation to FIGS. 7A-7E.

FIGS. 25A-25D show variants of the transducer 200 with an extra mass 251 added to the top of the transducer structure 202. The extra mass is made of a higher density material than the transducer structure 202. The longer dimension of the extra mass 251 preferably extends along the longitudinal axis of the spring. FIGS. 25A and 25B show the extra mass 251 on the top of the transducer structure, where dimensions of the extra mass vary in width and height. FIG. 25C shows that the extra mass 251 can be placed off-centered. The mass 251 can also be formed by attaching a metal wire or column using bonding or gluing or wire-bonding such as wedge bonding and ball bonding as shown in FIG. 25D.

In a different approach, the sensing electrodes 210 are formed over the top of stationary electrodes 204 as seen in FIGS. 26A and 26B. Again, the transducer 200 is comprised of a substrate 201; a transducer structure 202; one or more stationary electrodes 204; and one or more sensing electrodes 210. The transducer structure 202 is mounted on a top surface of the substrate 201 and extends upwardly from the top surface of the substrate 201. In this embodiment, the transducer structure 202 is comprised of a support beam 205 integrally formed with a proof-mass 206. In other embodiments, it is envisioned that the transducer structure 202 may be formed by a support beam 205 without a proof-mass. The one or more stationary electrodes 204 also extend upwardly from the top surface of the substrate and are arranged around periphery of the transducer structure 202. The one or more stationary electrodes 204 are spatially separated from the transducer structure 202 by a channel 207 that extends along entire height of the transducer structure. In this case, the size of the channel may vary from the top to the bottom or remain substantially constant.

The one or more sensing electrodes 210, however, are formed on a top surface of the transducer structure 202 (with or without a proof-mass). More specifically, the one or more sensing electrodes 210 extend radially outward from the transducer structure 202 and overhang at least a portion of a top surface 211 of the one or more stationary electrodes 204. In this way, the sensing gap $g_0$ is defined between the one or more sensing electrodes 210 and the top surface 211 of the one or more stationary electrodes 204. These overhanging electrodes 210 are electrically connected to the transducer structure 202 and form very well-controlled narrow transduction gaps with the electrodes on the side.

FIGS. 27A and 27B show the height of the transducer 200 can vary depending the substrate thickness, while still being able to achieve high sensitivity. The gap is formed between a hanging electrodes and the transducer structure. The support beam 205 can be made very thin with a high aspect-ratio. For example, 1 mm thick device could be built with a beam that is 900 µm long and 20 µm wide in FIG. 27A, and 100 µmm thick device could be built with a beam that is 80 µm long and 2 µm wide in FIG. 27B. It is understood that these dimensions are merely illustrative.

Referring to FIGS. 28A-28F, an example method is set forth for fabricating the transducer structure seen in FIG. 26A. Steps for fabricating the transducer structure 71 (i.e., first substrate) and the base structure 75 (i.e., second substrate) are not shown but except as otherwise noted herein may be implemented in the same manner as described in relation to FIGS. 7A-7E.

One difference is that a sacrificial layer 73 is formed on the bottom of the substrate supporting the transducer structure 71. In one embodiment, the sacrificial layer 73 may be formed by deposition of an oxide although other materials are contemplated by this disclosure. Another silicon layer 74 is then deposited onto the sacrificial layer 72. This secondary silicon layer 74 will serve as the basis for the sensing electrodes 210 as further described below. It is also noted that the channel formed between the transducer structure and the stationary electrodes may have a uniform width as seen here or sections of varying width as seen in FIGS. 7A-7E.

In FIG. 28B, the transducer structure 71 is inverted and mounted to the base structure 75. In the example embodiment, the transducer structure 71 is bonded to the base structure 72, for example by silicon-metal eutectic bonding, anodic bonding, or fusion bonding. As a result, the support beam 205 of the transducer structure 202 extends upwardly from the top surface of the base structure 72 with the overhangs of the proof-mass extending downward from the top of the support beam towards the top surface of the base structure 72.

Figure 28E:
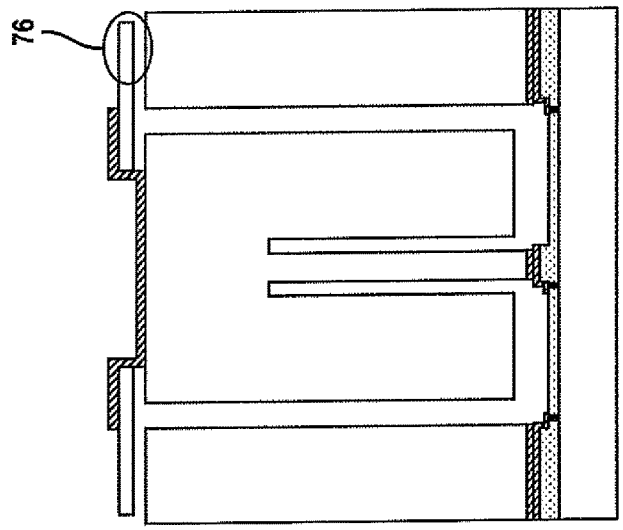
Figure 28D:
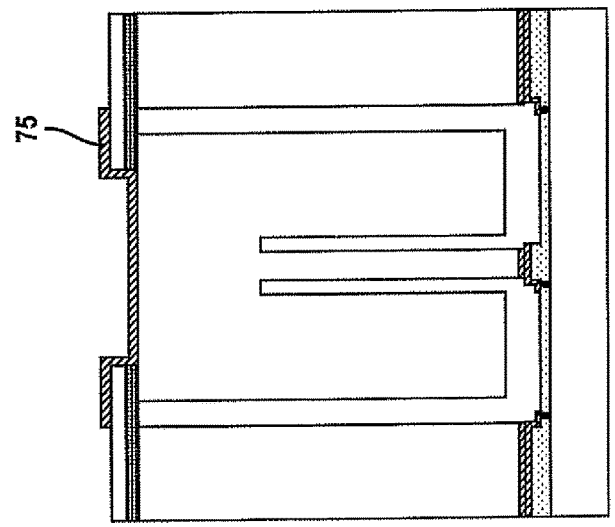
Figure 28F:
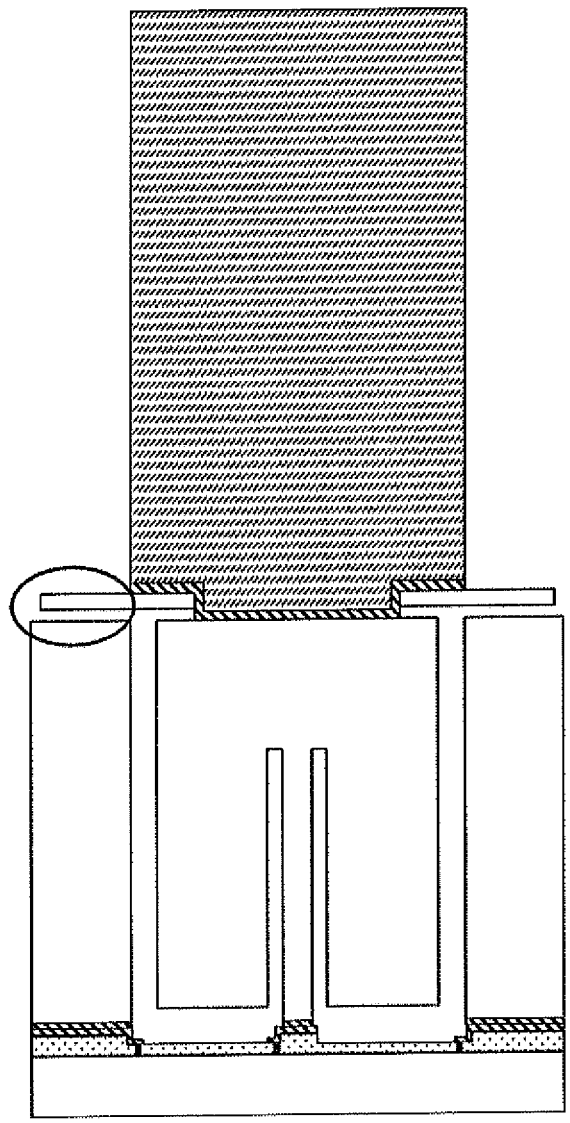

Next, a top metal contact 75 may be formed on top of the inverted transducer structure 71 as seen in FIG. 28D. To do so, a portion of the sacrificial layer 73 and the secondary silicon layer 74 are etched or otherwise removed from the transducer structure 71. Metal is then deposited onto the top of the inverted transducer structure 71, thereby forming the top metal contact 75. Specifically, the metal fills in the recess formed by the removal of the sacrificial layer 73 and the secondary silicon layer 74 as well as overlaps at least a portion of the secondary silicon layer 74. It is understood that the metal bonds with the overlapped portion of the secondary silicon layer 74. In FIG. 28E, the sacrificial layer 73 is removed (e.g., by vapor HF etch), thereby forming the sensing gap 76 for the transducer.

One way to make this sensing gap is using SOI (Silicon-on-Insulator) wafers. The thick handle silicon layer side can be used to form the tall and small footprint proof-mass by deep reactive ion etching and the buried oxide layer can be used as the sacrificial gap (e.g., <500 nm or even <100 nm). The buried oxide layer will be an etch stop for this deep reactive ion etching step. The device silicon layer is then patterned to form the overhanging electrodes after this wafer is bonded to another substrate. Since the buried oxide layer is insulating, additional electrical connections will need to be made between the device and handle silicon layers. The connection could be made by metal deposition. This gap can be made very narrow down to 100 nm-500 nm, thus providing a large $\Delta g/g_0$. While the above fabrication method has been described with specific components having specific values and arranged in a specific configuration, it will be appreciated that this method may be implemented with many different configurations, components, and/or values as necessary or desired for a particular application. The above configurations, components and values are presented only to describe one particular embodiment that has proven effective and should be viewed as illustrating, rather than limiting, the present disclosure.

Figure 29B:
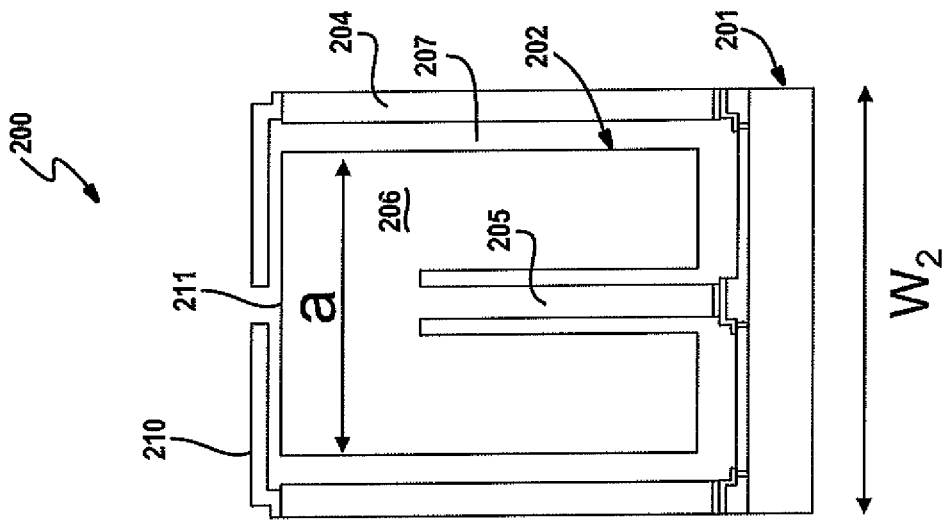
FIGS. 29A and 29B are diagrams illustrating how the footprint of a transducer can be reduced by positioning the sensing electrodes on top of the side electrodes.

Alternatively, the sensing electrodes 210 are formed over the top of the transducer structure 204 as seen in FIG. 29B. Likewise, the transducer 200 is comprised of a substrate 201; a transducer structure 202; one or more stationary electrodes 204; and one or more sensing electrodes 210. The transducer structure 202 is mounted on a top surface of the substrate 201 and extends upwardly from the top surface of the substrate. In this embodiment, the transducer structure 202 is comprised of a support beam 205 integrally formed with a proof-mass 206. In other embodiments, it is envisioned that the transducer structure 202 may be formed by a support beam 205 without a proof-mass. The one or more stationary electrodes 204 also extend upwardly from the top surface of the substrate 201 and are arranged around periphery of the transducer structure 202. The one or more stationary electrodes 204 are spatially separated from the transducer structure 202 by a channel 207 that extends along entire height of the transducer structure. In this case, the size of the channel may vary from the top to the bottom or remain substantially constant.

Figure 29A:
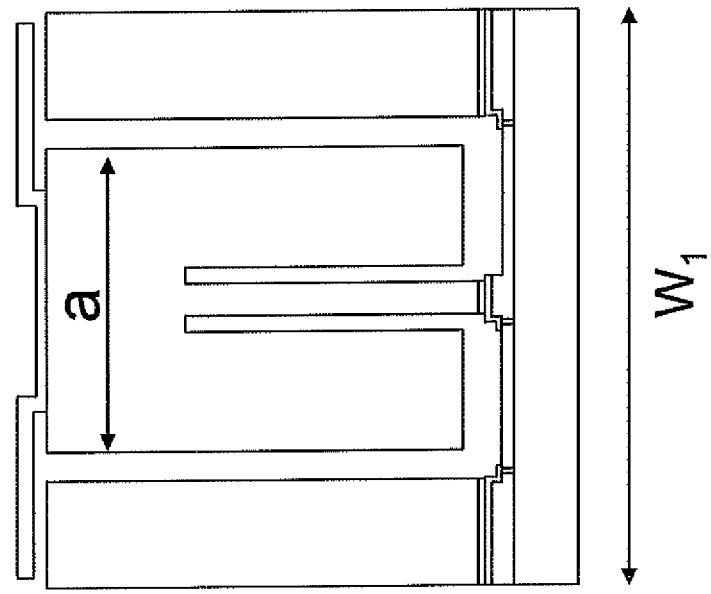

The one or more sensing electrodes 210, however, are formed on a top surface of the stationary electrodes 204. More specifically, the one or more sensing electrodes 210 extend inwardly from the stationary side electrodes 204 and overhang at least a portion of a top surface 211 of the transducer structure 202. In this way, the sensing gap $g_0$ is defined between the one or more overhanging sensing electrodes 210 and the top surface 211 of the transducer structure 202. These overhanging electrodes 210 are electrically connected to one or more stationary electrodes 204 and form very well-controlled narrow transduction gaps with the electrodes on the side. Since the sensing area is on top of the transducer structure 202, the footprint of the stationary electrodes 204 can be reduced. Compare the same transducer/spring-mass (dimension a and etc.) with different electrodes arrangements in FIGS. 29A and 29B, where W2<W1. This change can substantially reduce the footprint and increase the packaging density.

The selection of accelerometer is usually based on applications and measurement environments. One must determine whether one is trying to measure motion or vibration. For example, to use an accelerometer to measure motion accurately, the data must not contain any zero offset error; otherwise, it can lead to gross amount of velocity or displacement errors after numerical integrations. While for applications such as high-speed rotating machinery monitoring, it require accelerometers with exceptional high frequency characteristics. That is, the resonance of the accelerometer should be sufficiently high to avoid exciting the harmonics from the structure. However the design will have low output sensitivity. For high-g shock test, responses could be nonlinear and difficult to characterize. An accidental drop of a cellular phone from standing height can produce peak acceleration levels well over 10,000 g's due to localized material responses. For low-g vibration sensor has high sensitivity and good S/N. However, it also comes with limited dynamic range. In addition, the bandwidth and dynamic range of typical MEMS.

For a typical MEMS accelerometer using electrostatic method to measure continually varying acceleration, one mechanical sensor is used for single or multiple axis detection. The scale factor, the full-scale range, and the bandwidth are predetermined by the design of a single spring-mass-damper system and interface circuit.

Researchers have developed analytical apparatus for optimally combining measurements from N sensors into a single estimate that theoretically proves to be significantly improving the performance over that of individual element. Algorithm such as Kalman filtering is used to minimize the variance of errors. Currently the theory may only be tested by using commercially available consumer grade sensor chips.

Figure 30:
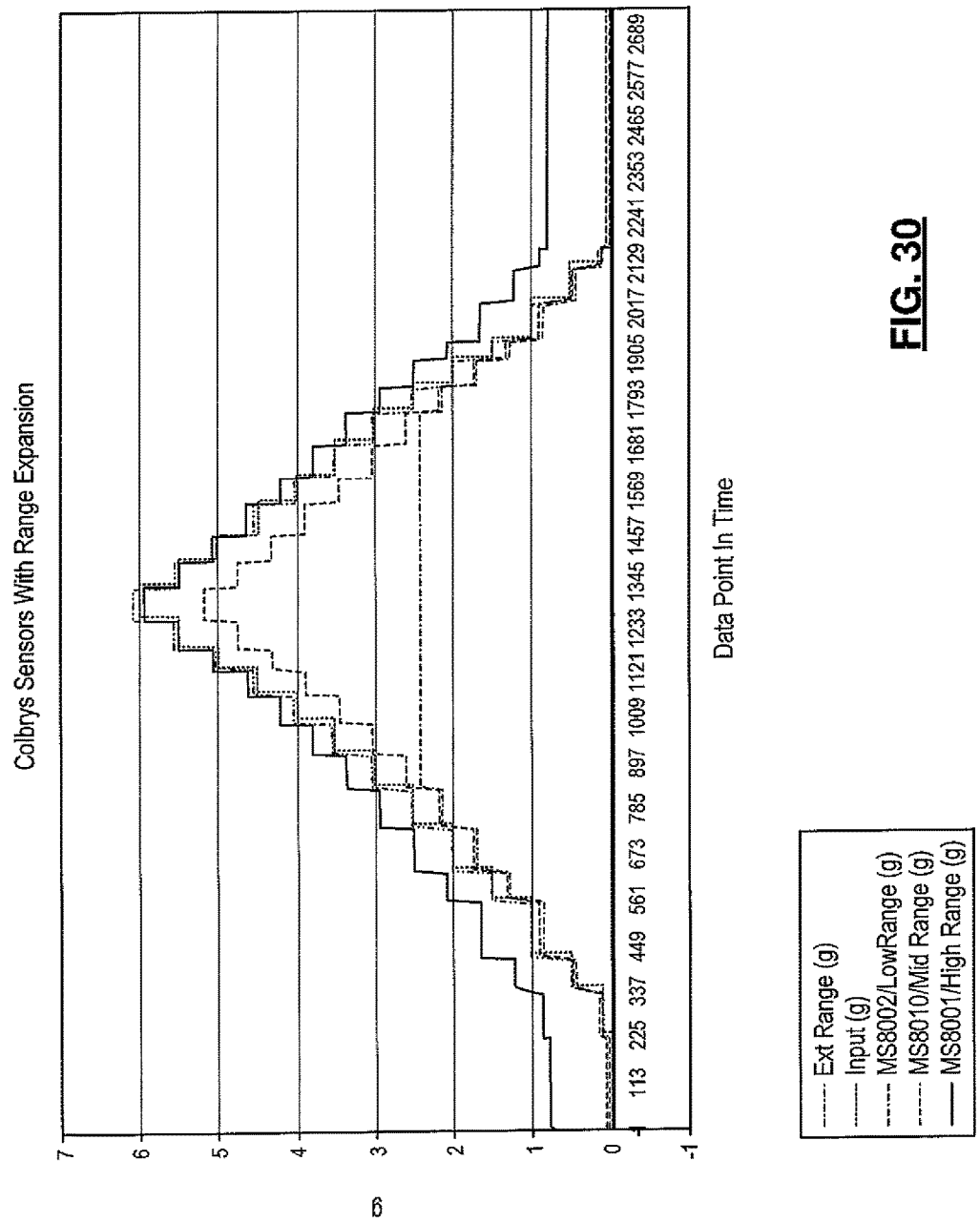
FIG. 30 is a graph showing an extended range array using three Colbrys accelerometers.

The full scale range has been extended using multi-sensor inertial array. Different weighing factor is assigned by data fusion algorithm. However, as can be seen from FIG. 30 although the higher noise at low-g range of the high-g range sensor will be multiplied by a smaller weight, it still means at low-g, error will be added by including the high-g-range sensor output. In addition, resolution at different acceleration level will be different. There are also numerous applications where the frequency information is desired immediately at the sensor output. Existing wide-band inertial sensors demand intensive computation by the control algorithms for further filtering and processing, and thus are very power hungry and slow down the control loop.

Since this accelerometer design can achieve higher performance within a smaller footprint than other accelerometer designs with similar transduction techniques, it is readily applicable to making large and dense accelerometer arrays to achieve high performance as seen in FIG. 1B. High performance inertial measurement unit can take advantage of large arrays of individual sensors with broad range of performance including: noise floor, dynamic range, and bandwidth. By varying the proof-mass size, spring dimensions, sensing area, sensing gap, each one of these difference accelerometer designs, the accelerometer array will respond to different acceleration level and frequency. The sensor array cannot work without local signal processing circuit to further process the signals and provide feedback. Another use of large array of sensor is to enable a frequency-band-selective inertial measurement. In addition, with a single device one cannot address issues like fault tolerance and measurement integrity, let alone implementing complicated algorithm to achieve highly accurate, repeatable and reliable measurements.

Figures 31A, 31B:
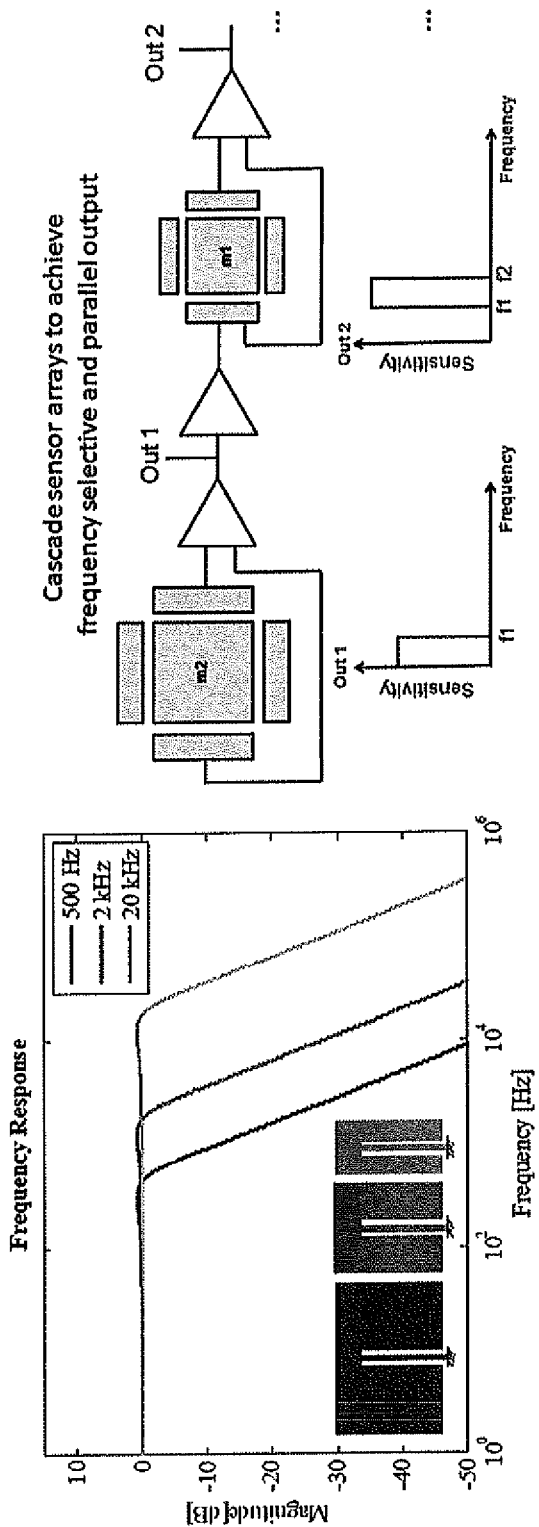
FIG. 31A is a graph showing frequency response for an array of accelerometers.
FIG. 31B is a diagram showing a cascade filter array to achieve frequency selective parallel output.

Since an accelerometer array is contemplated, the array can be further designed to achieve greater bandwidth, full-scale and dynamic range by varying various design parameters. Referring to FIGS. 31A and 31B, arrays of hair accelerometers of different spring-mass designs on a single acceleration sensor chip will enable us to differentiate frequency spectrum of the acceleration. By varying the proof mass size, −3 dB cutoff frequency is modulated at 500 Hz, 2 kHz and 20 k Hz. For example, accelerometer arrays will be designed to perform the subtraction (for example, as electrostatic softening) to extract the acceleration from 0 to 500 Hz, 500 Hz to 2 kHz, or from 2 kHz to 20 kHz, as a band pass filter.

To increase full-scale, one proposed implementation is by electrostatic force feedback between one/multiple high-g range sensor(s) and one/multiple low-g range sensor(s). With the same capacitance detection circuit specifications, high-g range sensors have lower resolution for a typical spring-mass system. Down-converting the high-g measurement to be handled by a low-g range sensor, one can achieve a high resolution system over the entire full scale range desired. In the meantime, while the higher sensitivity sensor has low cutoff frequency, the result can be combined with high-cutoff-frequency sensor to recover high frequency components, thus producing high dynamic range readout.

Figures 32A, 32B:
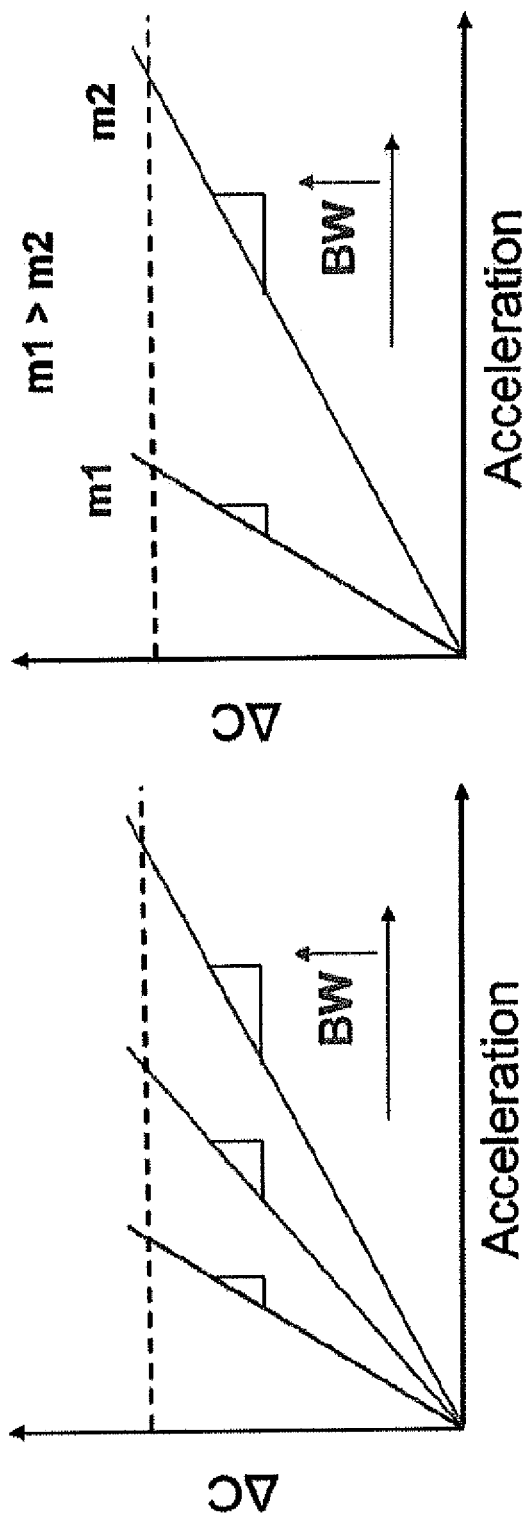
FIGS. 32A-32C are diagrams illustrating how to expand a two-sensor array to achieve increased scale and higher resolution.
Figure 32C:
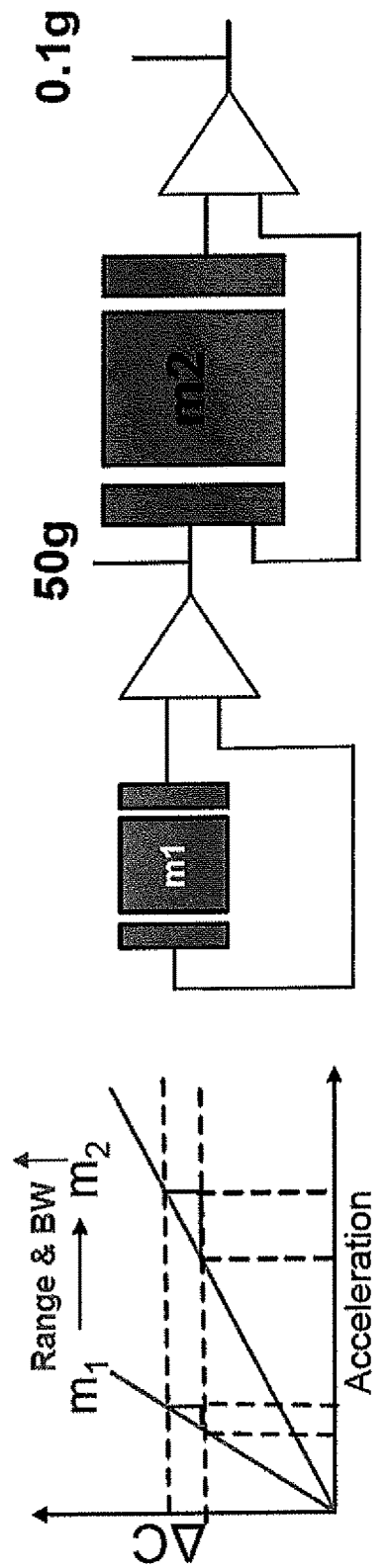

As shown in FIG. 32B, since proof-mass m1 is more massive than proof-mass m2, assuming all the other design parameters are the same, sensor 1 (m1) has a higher capacitive sensitivity but a smaller full-scale, for example, at 0.1 g. While sensor 2 (m2) is less sensitive but can measure a higher g, for example, at 50 g. In addition to the full-scale, assuming Analog-to-Digital Convertors (ADC) of the same resolution are used for each sensor in the array (minimum quantized ΔC), then sensor 1 has a higher resolution than sensor 2. Thus the output from m2 can be used to provide feedback to m1 by a DC balancing force to bring m1 to its neutral position. Then m1 can provide the best measurement accuracy possible for this sensor array system. As FIG. 32A, a two-sensor array can be expanded to a three-sensor array or N-sensor array to provide both a larger full-range and higher resolution.

Figure 33:
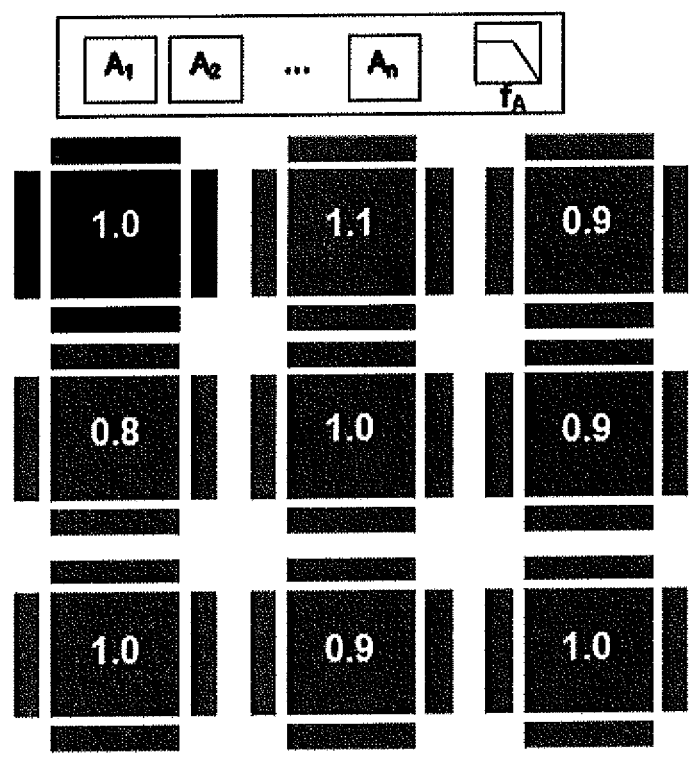
FIG. 33 is a diagram depicting an array of sensors to compensate for systematic noise and stochastic noise.

The systematic noise of the MEMS accelerometer due to MEMS/CMOS process variation or temperature variation, and the stochastic noise from the mechanical Brownian motion may be cancelled by implementing large arrays of the same sensor as shown in FIG. 33. The normally-distributed process variation can be compensated by choosing the sensor that deviates the least from the designed features from the large array. The cancellation of noise may also be done by inclusion of a reference cell. Stoppers may be designed to limit motion of the proof mass while maintaining the same spring-mass-damper dimensions. This sensor node along with the circuit will sense the temperature variation or other systematic noise as all the other actual sensing nodes. However it will be immune to external vibration and motion of interest. The mechanical Brownian noise $$\langle a_n \rangle \approx \sqrt{\frac{4kT\omega_0}{mQ}}$$

inherent to the mass-spring-damper system will be canceled in this fashion. Stochastic noise are proved in literature and some experiment to be reduce by $\sqrt{N}$ if an N-sensor-array of same sensors are used.

Another application of accelerometer array is combining electrostatic pull-in and threshold detection of large arrays of accelerometers. By designed an array of uniformly varying thresholds accelerometers, one can make a digital accelerometer. The range and resolution of the accelerometer would be determined by the thresholds of the individual accelerometers constituting the array.

For a one 1 DOF spring-mass-damper system with parallel plate electrostatic tuning ability, when the external acceleration is in the direction toward the countering electrodes, the spring restoring force Fk is balanced by the inertial force Fm and the electrostatic force Fc.

$$F_c = \frac{1}{2}\frac{\varepsilon A}{g^2}V_C^2, F_m = Ma, F_m = k(g_0 - g), F_k = F_m + F_c$$

$$V_{pull-in} = \left[\frac{2}{3}\right]^{\frac{3}{2}} \left[\frac{k}{\varepsilon A}\right]^{\frac{1}{2}} \left[g_0 - \frac{Ma}{k}\right]^{\frac{3}{2}}$$

Figure 34B:
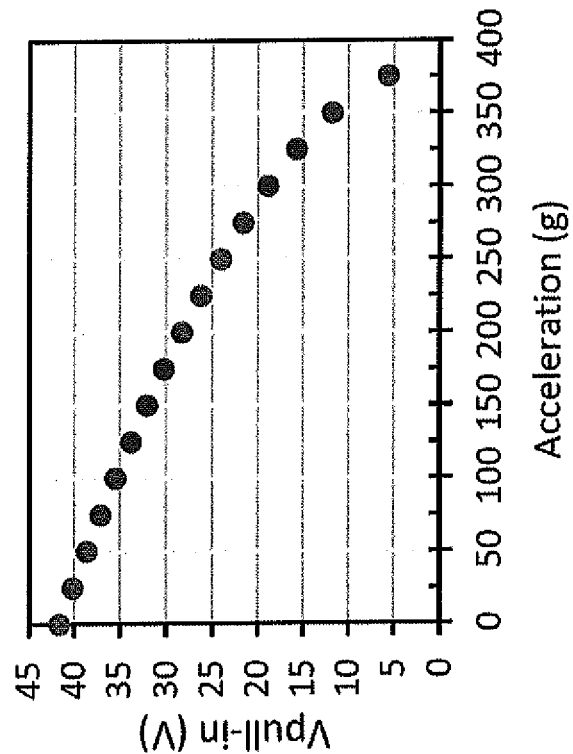
FIGS. 34A and 34B are graphs depicting pull-in and threshold detection for a parallel plate capacitor and an array of accelerometers, respectively.
Figure 34A:
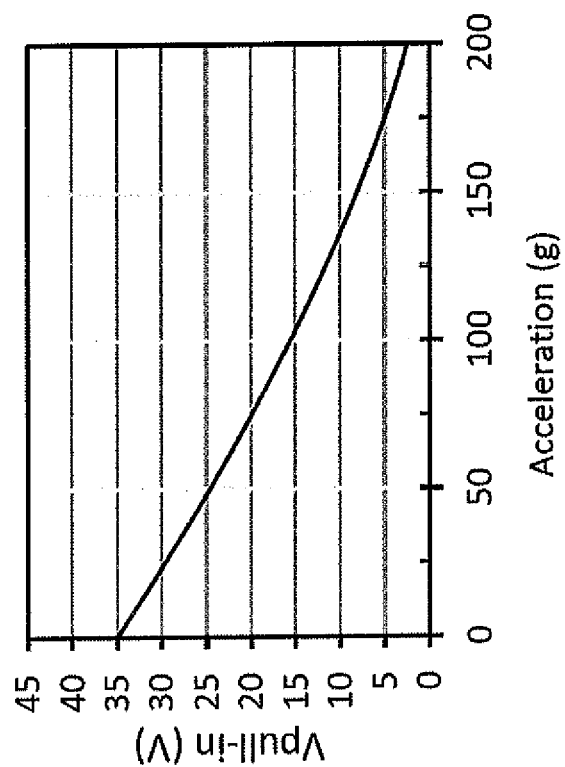
Figure 35B:
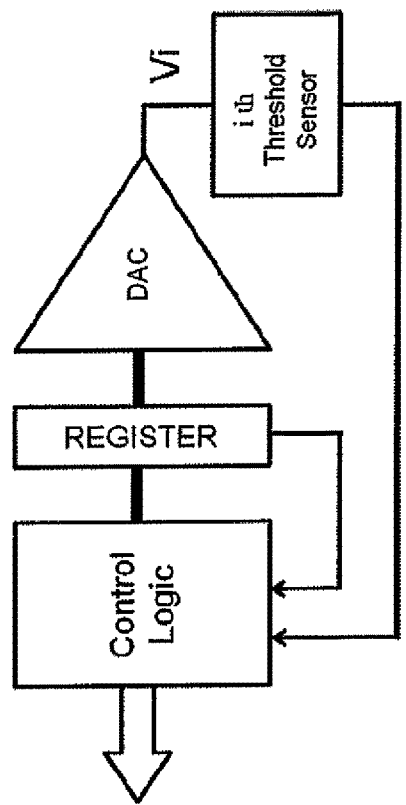
FIGS. 35A and 35B illustrate the pull-in and threshold detection for a local sensing and latching circuit.
Figure 35A:
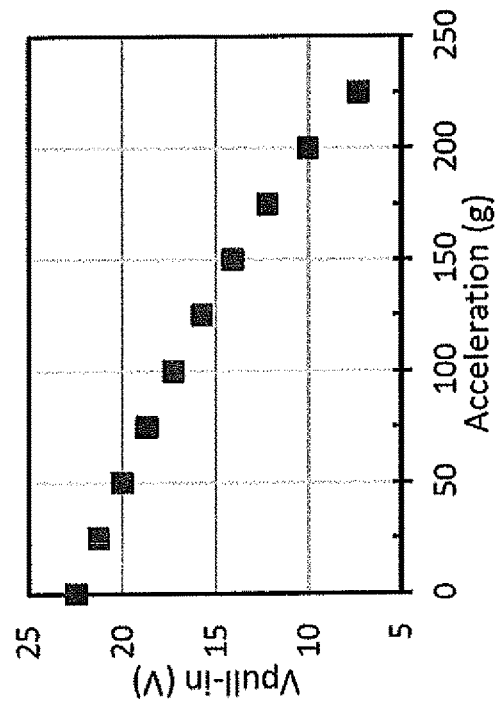

Pull-in occurs when spring restoring force can no long account for the external force. Quantitatively, the higher the external inertial force, the lower the Vpull-in. Traditional capacitive accelerometers are operated at a single ΔC vs. acceleration curve and typical threshold accelerometers are operated at the zero Vpull-in crossing of the Vpull-in vs. acceleration plot. FIG. 34A shows Vpull-in vs. external acceleration for a simplified 1DOF parallel plate capacitor with 20×20×400 μm³ vertical spring, 300×300×500 μm³ proof-mass, and 3 μm initial nominal capacitive gap. COMSOL FEA is used to simulate the pull-in curve for our particular hair structure (FIG. 34B).

The digital capacitive accelerometer arrays will be comprised of p×n×m sensors to cover a tunable range and provide fault tolerance.

1) Arrays of identical threshold acceleration sensors (size: n×m): m individual sensors comprises a group. Each of the n groups is biased at a different voltage $V_i$ (i=1:n), thus they will pull in at different acceleration $a_i$ (I=1:n). For example, monotonically decreasing the bias voltage from 22.52V to 10.08V one can cover the threshold level from 0 to 200 g by a single device design. It can also be swept only from 15.77V to 10.08V so that the entire n×m array is only sensitive to acceleration above 125 g and below 200 g. Each sensor unit consists of a mechanical sensor, digital to analog convertor, register and the local control logic. m multiple sensors in each group provide redundancy and robustness.

Figure 36B:
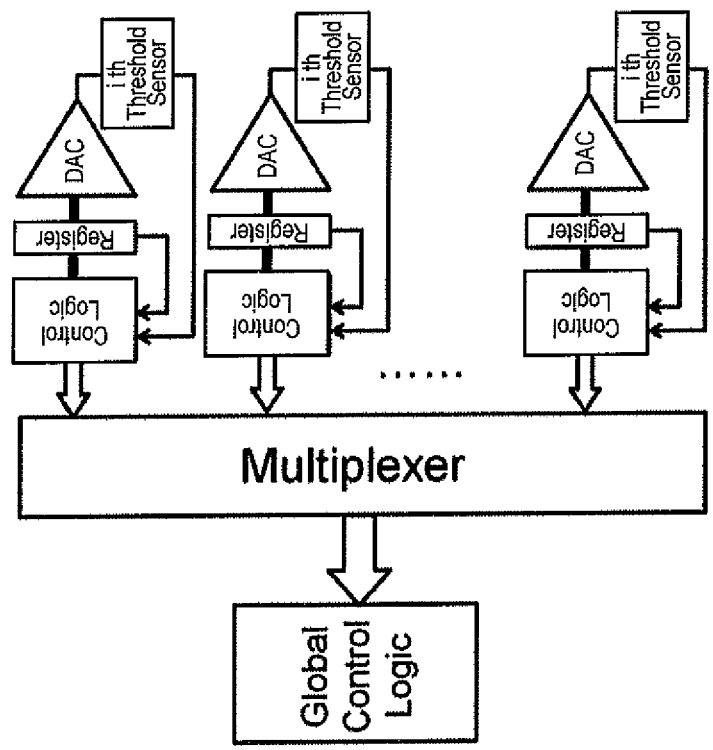
FIGS. 36A and 36B illustrate the pull-in and threshold detection for a digital capacitive threshold accelerometer array.
Figure 36A:
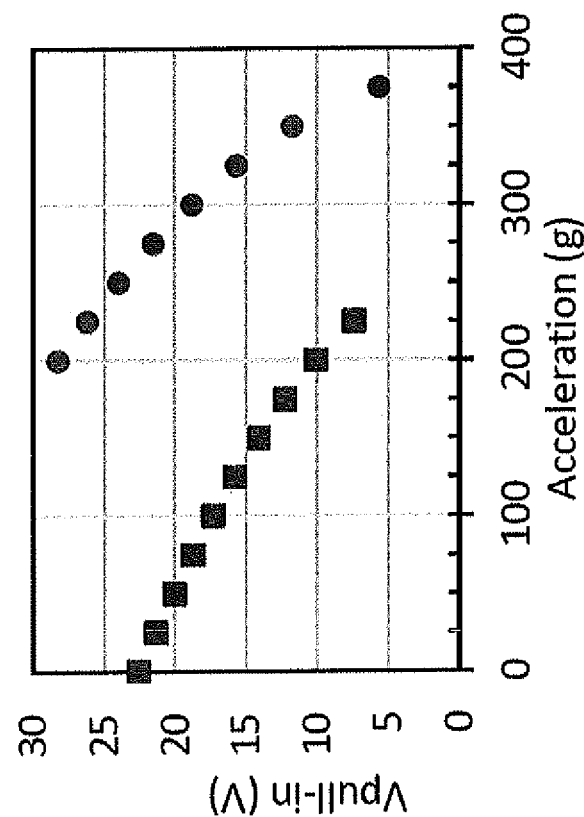

2) Multiple blocks of the n×m arrays are built to cover a wide range (total array size: p×n×m): One of the most powerful aspects of multi-transducer platform is that the sensor response can be readily tailored by its structural dimensions. Pull-in curves of two hairs that only differ in the proof-mass-to-electrode gap distance are plotted in FIG. 36A.

If the two blocks are supplied with the same bias source from 0 to 30V, one can cover 0-200 g and the other can cover 200-400 g assuming the same specifications of the DAC. The digital nature of the latching the states will provide direct information on the sensor blocks being selected and is easily interfaced with microprocessor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A transducer with a high aspect ratio, comprising:
a substrate;
a transducer structure mounted on a top surface of the substrate and extending upwardly from the top surface of the substrate, wherein the transducer structure is comprised of a cantilever beam integrally formed with a proof-mass, wherein the proof-mass extends from a top of the cantilever beam downwardly along one or more side surfaces of the cantilever beam towards the top surface of the substrate;
one or more sensing electrodes mounted to the top surface of the substrate and spatially separated from the transducer structure, wherein the one or more sensing electrodes are configured to measure a change in a gap formed between the one or more electrodes and the transducer structure, such that motion of the transducer structure causes a size of the gap to vary in a direction that is parallel with a longitudinal axis of the cantilever beam; and
one or more additional electrodes extending upwardly from the top surface of the substrate and arranged around a periphery of the transducer structure.

2. The transducer of claim 1 wherein the gap is formed between a bottom surface of the proof-mass facing the top surface of the substrate and the top surface of the substrate.

3. The transducer of claim 2 wherein a dimension of the gap between the bottom surface of the proof-mass and the top surface of the substrate is less than one micron.

4. The transducer of claim 3 wherein the transducer structure is comprised of silicon and a conductive material is deposited onto the bottom surface of the proof-mass.

5. The transducer of claim 3 wherein the one or more additional electrodes are spatially separated from the transducer structure by a channel that extends along an entire height of the transducer structure.

6. The transducer of claim 5 wherein a width of the channel proximate to a top of the transducer structure differs from a width of the channel proximate to a bottom of the transducer structure.

7. The transducer of claim 1 further comprising an extra mass deposited onto a top surface of the transducer structure, where material comprising the extra mass has a higher density than material comprising the transducer structure.

8. A transducer with a high aspect ratio, comprising:
a substrate;
a transducer structure mounted on a top surface of the substrate and extending upwardly from the top surface of the substrate, wherein the transducer structure is comprised of a support beam;
one or more stationary electrodes extending upwardly from the top surface of the substrate and arranged around a periphery of the transducer structure, wherein the one or more stationary electrodes are spatially separated from the transducer structure by a channel that extends along an entire height of the transducer structure; and one or more sensing electrodes formed on a top surface of the transducer structure, where the one or more sensing electrodes extend radially outward from the transducer structure and overhang at least a portion of a top surface of the one or more stationary electrodes, thereby defining a gap between the one or more sensing electrodes and the top surface of the one or more stationary electrodes.

9. The transducer of claim 8 wherein the transducer structure further includes a proof-mass integrally formed with the support beam, wherein the proof-mass extends from a top of the support beam downwardly along one or more side surfaces of the support beam towards the top surface of the substrate.

10. The transducer of claim 9 wherein a dimension of the channel between the transducer structure and the one or more stationary electrodes is substantially constant.

11. The transducer of claim 10 wherein the dimension of the gap between the one or more sensing electrodes and the top surface of the one or more stationary electrodes is less than one micron.

12. The transducer of claim 11 further comprising an extra mass deposited onto the top surface of the transducer structure, where material comprising the extra mass has a higher density than material comprising the transducer structure.

13. The transducer of claim 9 wherein the transducer structure and the one or more stationary electrodes are formed using deep reactive ion etching.

14. A transducer with a high aspect ratio, comprising:
a substrate;
a transducer structure mounted on a top surface of the substrate and extending upwardly from the top surface of the substrate, wherein the transducer structure is comprised of a support beam;
one or more stationary electrodes extending upwardly from the top surface of the substrate and arranged around periphery of the transducer structure, wherein the one or more stationary electrodes are spatially separated from the transducer structure by a channel that extends along an entire height of the transducer structure; and one or more sensing electrodes formed on a top surface of the one or more stationary electrodes, where the one or more sensing electrodes extend radially inward from the one or more stationary electrodes and overhang at least a portion of a top surface of the transducer structure, thereby defining a gap between the one or more sensing electrodes and the top surface of the transducer structure.

15. A transducer with a high aspect ratio, comprising:
a substrate;
a transducer structure mounted on a top surface of the substrate and extending upwardly from the top surface of the substrate, wherein the transducer structure is comprised of a support beam integrally formed with a proof-mass;
one or more stationary electrodes extending upwardly from the top surface of the substrate and arranged around periphery of the transducer structure, wherein the one or more stationary electrodes are spatially separated from the transducer structure by a channel that extends along an entire height of the transducer structure, such that a width of the channel proximate to a top of the transducer structure differs from a width of the channel proximate to a bottom of the transducer structure; and
an extra mass deposited on the top surface of the transducer structure, where material comprising the extra mass has a higher density than material comprising the transducer structure.

16. The transducer of claim 15 wherein the extra mass has a height dimension extending upward from the top surface of the transducer structure along an axis that is parallel with a longitudinal axis of the support beam.

17. The transducer of claim 15 wherein the extra mass is further defined as a metal electroplated onto the top surface of the transducer structure.

18. The transducer of claim 15 wherein the extra mass is further defined as a wire.

19. The transducer of claim 15 wherein the channel has a narrow section and a wider section, such that a dimension of the channel between the transducer structure and the one or more stationary electrodes in the narrow section is less than the wider section.

* * * * *